United States Patent
Ushijima et al.

(10) Patent No.: US 6,739,238 B2
(45) Date of Patent: May 25, 2004

(54) SLIDING STRUCTURE FOR A RECIPROCATING INTERNAL COMBUSTION ENGINE AND A RECIPROCATING INTERNAL COMBUSTION ENGINE USING THE SLIDING STRUCTURE

(75) Inventors: Kenshi Ushijima, Kanagawa (JP); Yoshiteru Yasuda, Yokohama (JP); Makoto Kano, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 156 days.

(21) Appl. No.: 09/986,603

(22) Filed: Nov. 9, 2001

(65) Prior Publication Data

US 2002/0090155 A1 Jul. 11, 2002

(30) Foreign Application Priority Data

Nov. 20, 2000 (JP) ........................ 2000-352397

(51) Int. Cl.⁷ ............................... F01B 31/10
(52) U.S. Cl. ...................................... 92/158
(58) Field of Search ................ 92/20 R, 153, 92/158, 172, 162 R; 277/399, 406

(56) References Cited

U.S. PATENT DOCUMENTS

| | | |
|---|---|---|
| 4,538,929 A | 9/1985 | Ehrentraut et al. |
| 4,554,208 A | 11/1985 | MacIver et al. |
| 4,755,426 A | 7/1988 | Kokai et al. |

(List continued on next page.)

FOREIGN PATENT DOCUMENTS

| | | |
|---|---|---|
| EP | 0 529 327 A1 | 3/1993 |
| EP | 0 661 470 A2 | 7/1995 |
| EP | 0 731 190 B1 | 5/1999 |
| JP | 6-294307 A | 10/1994 |
| JP | 7-090553 A | 4/1995 |
| JP | 2000-504089 A | 4/2000 |
| WO | WO 92/02602 A1 | 2/1992 |
| WO | WO 93/21289 A1 | 10/1993 |
| WO | WO 01/05917 A1 | 1/2001 |

OTHER PUBLICATIONS

Database WPI Week 200065, Nov. 28, 2000, Derwent Publications, Ltd., AN 2000640583, XP002240184, JP 2000–327484.

Japanese Industrial Standard, "Vickers Hardness Test—Test Method", JIS Z 2244, 1998, pp. 1–8 (with translation).

Japanese Industrial Standard, "High Carbon Chromium Bearing Steels", JIS G 4805, 1999, pp. 1–31 (with translation).

Meyer–Rässler, "Neuartige Laufflächen–Schutzverfahren für Kolben von Verbrennungsmotoren," VDI–Zeitschrift, 1942, vol. 86, No. 15/16, pp. 245 to 247.

Engine Oil Viscosity Classification—SAE J300 revised Apr. 1997, p. 133.

(List continued on next page.)

*Primary Examiner*—Edward K. Look
*Assistant Examiner*—Igor Kershteyn
(74) *Attorney, Agent, or Firm*—Foley & Lardner LLP

(57) ABSTRACT

A sliding structure for a reciprocating internal combustion engine, including sliding elements relatively slidable via lubricating oil therebetween, the sliding elements including sliding surfaces opposed to each other and lubricated with a laminar flow of the lubricating oil. The sliding surfaces each have base surfaces and microscopic dimples or grooves which are so constructed as to prevent reduction of flow resistance to the lubricating oil passing through a clearance between the sliding surfaces and assure a lubricating oil film thickness required for reducing friction loss between the sliding elements.

31 Claims, 9 Drawing Sheets

U.S. PATENT DOCUMENTS

| | | | |
|---|---|---|---|
| 4,783,368 A | | 11/1988 | Yamamoto et al. |
| 4,834,400 A | * | 5/1989 | Lebeck ................ 277/399 |
| 4,974,498 A | | 12/1990 | Lemelson |
| 5,077,990 A | | 1/1992 | Plath |
| 5,190,824 A | | 3/1993 | Itoh |
| 5,205,188 A | | 4/1993 | Repenning et al. |
| 5,237,967 A | | 8/1993 | Willermet et al. |
| 5,249,554 A | | 10/1993 | Tamor et al. |
| 5,466,431 A | | 11/1995 | Dorfman et al. |
| 5,630,953 A | | 5/1997 | Klink |
| 5,735,769 A | | 4/1998 | Takemura et al. |
| 5,843,571 A | | 12/1998 | Sho |
| 6,059,460 A | * | 5/2000 | Ono et al. ............ 384/322 |
| 6,095,690 A | | 8/2000 | Niegel et al. |
| 6,237,441 B1 | | 5/2001 | Nishioka et al. |
| 6,523,456 B1 | * | 2/2003 | Kobayashi et al. ........ 92/158 |
| 2002/0148430 A1 | | 10/2002 | Kano et al. |
| 2003/0128903 A1 | | 7/2003 | Yasuda et al. |
| 2003/0162672 A1 | | 8/2003 | Shirahama et al. |

OTHER PUBLICATIONS

Kano et al., "Friction Property of Hard Carbon film in Engine Oil", Japan Tribology Congress 1999, 5, Tokyo, Proceeding pp. 11 and 12.

Kano et al, "The Effect of ZDDP and MODTC Additives on Friction Properties of DLC and Steel Cam Follower in Engine Oil", Abstracts of Papers from $2^{nd}$ World Tribology Congress, Sep. 3–7, 2001, p. 342.

Japanese Industrial Standard, "Carbon Steels for Machine Structural Use", Japanese Standards Association, JIS G 4051, 1979, pp. 1–10.

Japanese Industrial Standard, "Chromium Steels", Japanese Standards Association, JIS G 4104, 1979, pp. 1–9.

"Standard Test Method for Separation of Representative Aromatics and Nonaromatics Fractions of High–Boiling Oils by Elution Chromatography", ASTM Designation: D 2549—91 (Reapproved 1995), pp. 895–900.

International Standard, "Petroleum products—Determination of Base Number—Perchloric Acid Potentiometric Titration Method", ISO 3771, Second Edition Aug. 15, 1994, pp. 1–8.

API Motor Oil Guide, Which Oil is Right for You, American Petroleum Institute, Copyright 2002.

Japanese Industrial Standard, "Chromium Molybdenum Steels", Japanese Standards Association, JIS G 4105, 1979, pp. 1–11.

Dr. Marx, "Surfaces and Contact Mechanics", XP–002233233, Google, Retrieved from the Internet, Mar. 3, 2003, pp. 1–18.

Patent Abstracts of Japan, vol. 2000, No. 09, Oct. 13, 2000, JP 2000–170768, Jun. 20, 2000.

Patent Abstracts of Japan, vol. 2000, No. 01, Jan. 31, 2000, JP 11–287329, Oct. 19, 1999.

Patent Abstracts of Japan, vol. 1996, No. 09, Sep. 30, 1996, JP 08–128448, May 21, 1996.

U.S. patent application Ser. No. 09/814,165, Ushijima et al., filed Mar. 22, 2001.

"Assessment of $2^{nd}$ to $5^{th}$ Order Irregularities of Surface Configuration by Means of Sections of Surfaces Definitions Relating to Reference System and Dimensions," DIN 4762, UDC 621–288:001.4 (Aug. 1960), pp. 1–4.

"Surface Roughness—Definitions and Designation," Japanese Industrial Standard, JIS B 0601, UDC 003.62:621.7.015 (1994), pp. 1–26.

"Geometrical Product Specifications (GPS)—Surface Texture: Profile Method—Terms, Definitions and Surface Texture Parameters," International Standard, ISO 4287, TC 213 (1997), pp. 1–25.

* cited by examiner

SLIDING STRUCTURE FOR A RECIPROCATING INTERNAL COMBUSTION ENGINE AND A RECIPROCATING INTERNAL COMBUSTION ENGINE USING THE SLIDING STRUCTURE

BACKGROUND OF THE INVENTION

The present invention relates to a friction reduction technology based on a microstructure of sliding surfaces of mechanical components relatively slidable. More specifically, this invention relates to a surface roughness microstructure of sliding elements of a sliding structure for a reciprocating internal combustion engine, which is adapted to reduce friction loss in the reciprocating internal combustion engine.

The sliding elements of reciprocating internal combustion engines includes a crankshaft, a bearing metal, a piston skirt, a cylinder wall and the like. In a related art, a sliding surface of the crankshaft has a microstructure in which deep valleys are continuously formed over a wide region of its base surface having fine projections and recesses. In another related art, a sliding surface of the piston skirt has ten-point mean roughness Rz of not less than 20 μm which is prescribed in JIS B 0601-1994. Owing to the surface roughness, even when the sliding surface of the piston skirt suffers from wear, microscopic valleys formed on the sliding surface still remain and act as oil retention recesses. The effect of oil retention can improve antiseizure properties of the piston skirt under insufficient lubricating condition thereof and high-revolution and high-load condition of the internal combustion engine. Further, in a related art, a sliding surface of the cylinder wall has a cross-hatched microstructure in which deep valleys are continuously arranged over a wide area to form intersecting grooves.

U.S. Pat. No. 6,095,690 discloses sliding bearing elements for use in reciprocating internal combustion engines, which have lubricating oil pockets on the sliding surfaces. The lubricating oil pockets have predetermined depths and are provided in predetermined regions. This related art aims to improve antiseizure properties of the sliding bearing elements under insufficient lubricating condition of the sliding bearing elements and high-revolution and high-load condition of the internal combustion engine.

SUMMARY OF THE INVENTION

In general, the thickness of a lubricating oil film formed between the relatively moving sliding surfaces which have such a surface roughness as described above and are subjected to load, is determined depending on balance between an amount of the lubricating oil introduced into a clearance between the sliding surfaces upon relative motion of the sliding surfaces and an amount of the lubricating oil leaked or discharged from the clearance due to pressure caused by the load. Upon being discharged from the clearance, the lubricating oil flows along the sliding surfaces which define the clearance, and a large amount of the lubricating oil flows out from a portion of the clearance in which the flow resistance is relatively small. Here, the flow of lubricating oil is a laminar flow. The amount of the laminar flow varies in proportion to cube of the clearance allowing the laminar flow to pass therethrough. Therefore, if such a portion of the clearance continuously extends in a direction of the flow of lubricating oil over a wide region of the sliding surfaces, the flow resistance at the portion of the clearance will remarkably decrease.

In addition, if the crankshaft described in the related art is used with the bearing metal having microscopic oil retention recesses on the sliding surface, the continuous microscopic deep valleys of the sliding surface of the crankshaft will be fluidly connected with the microscopic oil retention recesses of the sliding surface of the bearing metal. Similarly, in the combination of the cylinder wall as described in the related art and the piston skirt having microscopic oil retention recesses on the sliding surface, there is a tendency that fluid connection occurs between the continuous microscopic deep valleys of the sliding surface of the cylinder wall and the microscopic oil retention recesses of the sliding surface of the piston skirt. When the lubricating oil is discharged from the clearance between the sliding surfaces of these sliding elements, the lubricating oil selectively flows through the region of the sliding surfaces where the deep valleys and the oil retention recesses are fluidly connected. This causes reduction of the flow resistance so that the thickness of the lubricating oil film decreases. As a result, a shear force of the lubricating oil becomes larger to thereby increase friction loss in the internal combustion engine.

There is a demand to eliminate the above-described problems in the related arts. An object of the present invention is to provide a sliding structure for a reciprocating internal combustion engine which is capable of suppressing reduction of flow resistance to the lubricating oil flowing between opposed sliding surfaces of two sliding elements to thereby maintain an appropriate thickness of the lubricating oil film between the sliding surfaces, reduce friction loss due to undesirable decrease of the lubricating oil film thickness, and then improve performance of the reciprocating internal combustion engine.

According to one aspect of the present invention, there is provided a sliding structure for a reciprocating internal combustion engine, comprising:

sliding elements relatively slidable via lubricating oil therebetween, the sliding elements including sliding surfaces opposed to each other and lubricated with a laminar flow of the lubricating oil, the sliding surfaces defining a first clearance therebetween from which the laminar flow of the lubricating oil leaks, wherein, assuming that the sliding surfaces are completely smooth surfaces defining a second clearance therebetween from which the laminar flow of the lubricating oil leaks, a first surface integral T of an inverse number of the first clearance is smaller than a second surface integral Tsmooth of an inverse number of the second clearance under condition that flow resistances to the laminar flows of the lubricating oil which leak from the first and second clearances are equal to each other with respect to pressure gradient in a direction of leakage of the laminar flows of the lubricating oil.

According to a further aspect of the present invention, there is provided a sliding structure for a reciprocating internal combustion engine, comprising:

sliding elements relatively slidable via lubricating oil therebetween, the sliding elements including sliding surfaces opposed to each other and lubricated with a laminar flow of the lubricating oil, each of the sliding surfaces including a base surface with microscopic irregularities having a maximum height t, and a plurality of dimples formed in a separate relation to each other on the base surface, wherein, if the sliding surfaces are completely smooth surfaces defining a minimum clearance therebetween an amount of the lubricating oil introduced into the minimum clearance upon relative motion of the sliding elements balances with an amount of the lubricating oil discharged therefrom by pressure generated between the sliding elements, the minimum clearance is larger than a sum of the maximum heights of the microscopic irregularities of the base surfaces and smaller than an average value of maximum depths of the dimples of at least one of the sliding surfaces, and an average value of maximum diameters of the dimples of one of the sliding surfaces is smaller than an average value of minimum distances between the dimples of the other of the sliding surfaces.

According to a still further aspect of the present invention, there is provided a sliding structure for a reciprocating internal combustion engine, comprising:

a cylinder wall including a first sliding surface;

a piston skirt reciprocally moveable relative to the cylinder wall, the piston skirt including a second sliding surface opposed to the first sliding surface; and a piston ring mounted to the piston skirt, the piston ring including a third sliding surface opposed to the first sliding surface;

each of the first, second and third sliding surfaces including a base surface with microscopic irregularities having a maximum height t, and a plurality of dimples separated from each other by the base surface, wherein an average value d of maximum diameters of the dimples of the first and third sliding surfaces is not more than an axial length of the piston ring, wherein a relationship between the average value d of maximum diameters of the dimples of the first sliding surface, an average value LS of minimum distances between the dimples of the second sliding surface, and an average value LR of minimum distances between the dimples of the third sliding surface is expressed as follows:

$$d < LS \text{ and } d < LR, \text{ and}$$

wherein the maximum height t of the microscopic irregularities of the base surface is smaller than a smaller one of minimum clearances generated between the first and second sliding surfaces and between the first and third sliding surfaces, the minimum clearances being determined assuming that the first, second and third sliding surfaces are completely smooth surfaces, and that an amount of the lubricating oil introduced into the minimum clearances upon relative motion of the cylinder wall, the piston skirt and the piston ring balances with an amount of the lubricating oil discharged from the minimum clearances by pressure generated between the cylinder wall, the piston skirt and the piston ring under a maximum operating time condition of the reciprocating internal combustion engine.

According to a still further aspect of the present invention, there is provided a sliding structure for a reciprocating internal combustion engine for automobiles, comprising:

a cylinder wall including a first sliding surface defining a cylinder bore, the first sliding surface including a base surface with microscopic irregularities having a maximum height of not more than 1 $\mu$m, and a plurality of dimples separated from each other by the base surface, the dimples having a depth ranging from 1 $\mu$m to 50 $\mu$m and an average value of maximum diameters thereof which is not more than 50 $\mu$m;

a piston skirt reciprocally moveable within the cylinder bore, the piston skirt including a second sliding surface opposed to the first sliding surface, the second sliding surface including a base surface with microscopic irregularities having a maximum height of not more than 5 $\mu$m, and a plurality of dimples separated from each other by the base surface, the dimples having a depth ranging from 1 $\mu$m to 50 $\mu$m, an average value of maximum diameters thereof which is not more than 1 mm, and an average value of minimum distances therebetween which is larger than the average value of maximum diameters of the dimples of the cylinder wall; and a piston ring mounted to the piston skirt, the piston ring including a third sliding surface opposed to the first sliding surface, the third sliding surface including a base surface with microscopic irregularities having a maximum height of not more than 1 $\mu$m, and a plurality of dimples separated from each other by the base surface, the dimples having a depth ranging from 1 $\mu$m to 50 $\mu$m, the average value of maximum diameters thereof which is not more than 50 $\mu$m, and an average value of minimum distances therebetween which is larger than the average value of maximum diameters of the dimples of the cylinder wall.

According to a still further aspect of the present invention, there is provided a sliding structure for a reciprocating internal combustion engine, comprising:

sliding elements relatively slidable via lubricating oil therebetween, the sliding elements including sliding surfaces opposed to each other and lubricated with a laminar flow of the lubricating oil, the sliding surfaces including base surfaces with microscopic irregularities having maximum heights t, respectively, and a plurality of grooves extending at an angle of not less than 45 degrees relative to a direction of the sliding motion of the sliding elements without intersecting, the grooves having an average value of maximum depths which is larger than the maximum heights t, the grooves having maximum widths of not more than a contact length CL in the direction of the sliding motion over which the sliding surfaces are in contact with each other via a film of the lubricating oil disposed therebetween, wherein an average value b of the maximum widths of the grooves of one of the sliding surfaces is smaller than an average value of minimum distances between the grooves of the other of the sliding surfaces.

According to a still further aspect of the present invention, there is provided a reciprocating internal combustion engine, comprising:

a sliding structure including sliding elements relatively slidable via lubricating oil therebetween, the sliding elements including sliding-surfaces opposed to each other and lubricated with a laminar flow of the lubricating oil, the sliding surfaces defining a first clearance therebetween from which the laminar flow of the lubricating oil leaks, wherein, assuming that the sliding surfaces are completely smooth surfaces defining a second clearance therebetween from which the laminar flow of the lubricating oil leaks, a first surface integral T of an inverse number of the first clearance is smaller than a second surface integral Tsmooth of an inverse number of the second clearance under condition that flow resistances to the laminar flows of the lubricating oil which leak from the first and second clearances are equal to each other with respect to pressure gradient in a direction of leakage of the laminar flows of the lubricating oil.

DETAILED DESCRIPTION OF THE INVENTION

Figure 1A:
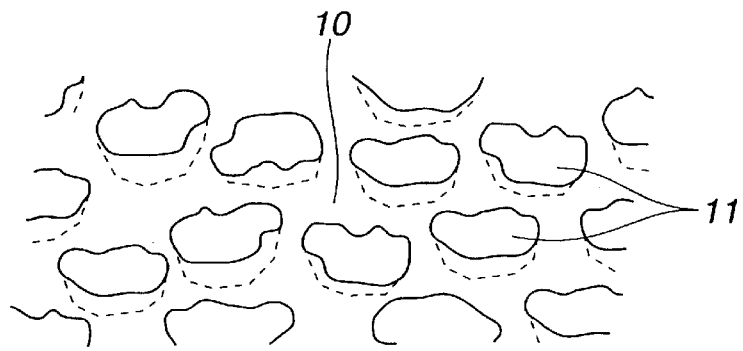
FIG. 1A is a schematic perspective view of a microstructure of a sliding surface of sliding elements of a sliding structure of a first embodiment, according to the present invention, showing a base surface and dimples.
Figure 1B:
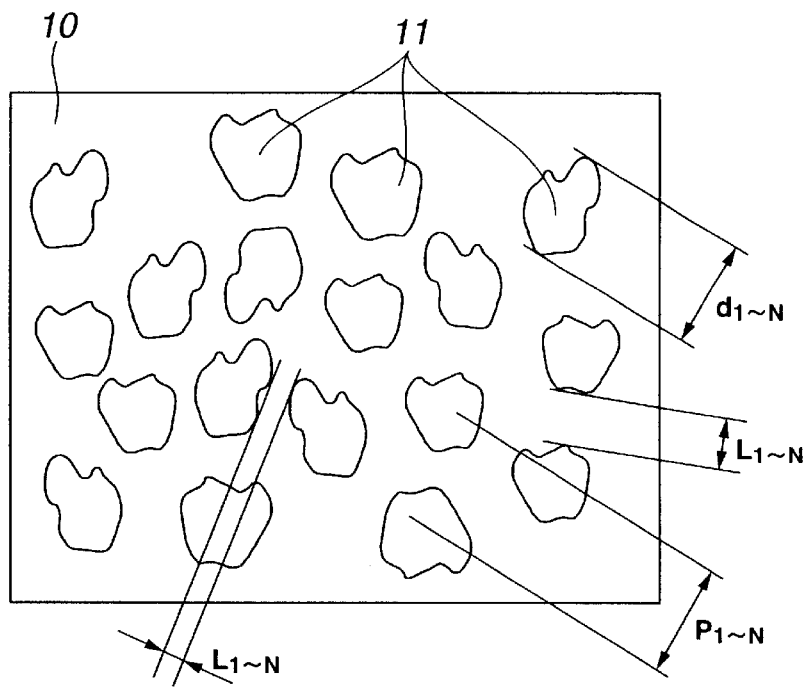
FIG. 1B is a plan view of the microstructure shown in FIG. 1A.
Figure 1C:
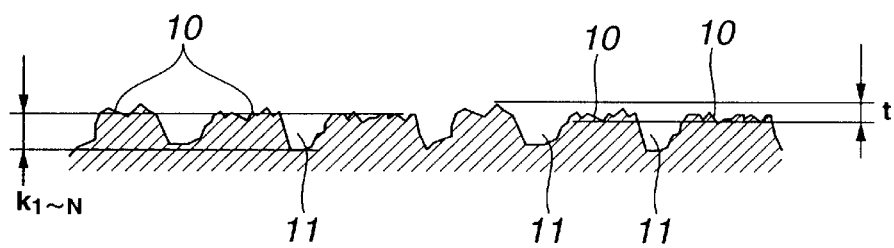
FIG. 1C is a sectional view of the microstructure shown in FIG. 1A.

Referring to FIGS. 1A–1C, sliding elements for a reciprocating internal combustion engine, of a first embodiment, according to the present invention, will be explained hereinafter. In actual operation, two sliding elements are relatively slidable via lubricating oil therebetween. The two sliding elements have sliding surfaces opposed to each other and lubricated with the lubricating oil. FIGS. 1A–1C show a microstructure of each of the sliding surfaces. As illustrated in FIG. 1A, the sliding surface includes base surface 10 and a plurality of microscopic dimples 11 separated from each other by base surface 10. Base surface 10 is intervened between dimples 11. Base surface 10 has microscopic irregularities, namely, recesses and projections, having maximum height t as shown in FIG. 1C. Maximum height t is represented in terms of maximum height Ry prescribed in JIS B 0601-1994. Dimples 11 had a generally part-spherical shape. If the number of dimples 11 are indicated by 1 to N, dimples 11 have maximum diameters $d_{1-N}$ shown in FIG. 1B and maximum depths $k_{1-N}$ shown in FIG. 1C. The maximum diameter of each dimple 11 means a maximum diameter of an opening area of dimple 11. Minimum distances between adjacent dimples 11 are indicated at $L_{1-N}$ shown in FIG. 1B, and pitch thereof is indicated at $P_{1-N}$ shown in FIG. 1B. Average value k of maximum depths $k_{1-N}$ is larger than maximum height t. Average value d of maximum diameters $d_{1-N}$ of dimples 11 of one of the sliding surfaces is smaller than average value L of minimum distances $L_{1-N}$ between dimples 11 of the other of the sliding surfaces.

The sliding surfaces define a first clearance therebetween from which a laminar flow of the lubricating oil leaks. Assuming that the sliding surfaces are completely smooth surfaces and a second clearance is defined therebetween from which the laminar flow of the lubricating oil leaks, first surface integral T of an inverse number of the first clearance is smaller than second surface integral Tsmooth of an inverse number of the second clearance under condition that the laminar flows of the lubricating oil which leak from the first and second clearances, respectively, have substantially equal flow resistances with respect to pressure gradient in a direction of leakage of the laminar flows of the lubricating oil. Here, the completely smooth surface means a theoretically completely smooth surface. The theoretically completely smooth surface is a plane in which a center line of a roughness curve lies and has a surface roughness of substantially zero.

Further, if the opposed sliding surfaces are the theoretically completely smooth surfaces defining minimum clearance MIC therebetween and an amount of the lubricating oil introduced into minimum clearance MIC upon relative motion of the two sliding elements balances with an amount of the lubricating oil discharged therefrom by pressure generated between the two sliding elements, minimum clearance MIC is larger than a sum of maximum heights t of the microscopic irregularities of base surfaces 10 and smaller than average value k of maximum depths of dimples 11 of at least one of the sliding surfaces. In this case, friction loss is reduced. Minimum clearance MIC is determined under an ordinary operating condition of the engine which frequently occurs and is most influenced for friction loss and fuel consumption. The ordinary operating condition of the engine is ⅓ of a maximum revolution number and ¼ of a maximum load. The ordinary operating condition of the engine may include a maximum operating time at ⅓ of a maximum revolution number and ¼ of a maximum load. Minimum clearance MIC0 smaller than minimum clearance MIC is determined under other operating condition of the engine which is high-speed and high-temperature operating condition.

Specifically, the thickness of the lubricating oil film formed between the sliding surfaces to which load is applied, is determined depending on the balance between an amount of the lubricating oil introduced into the clearance between the sliding surfaces upon relative motion of the sliding surfaces and an amount of the lubricating oil discharged or leaked from the clearance due to pressure caused by the load. Upon being discharged from the clearance between the sliding surfaces, the lubricating oil flows along the sliding surfaces, and a large amount of the lubricating oil flows out from a relatively wide space defined by surface configurations of the sliding surfaces, wherein the flow resistance is small. Here, the flow of lubricating oil is a laminar flow, and the amount of the laminar flow varies in proportion to cube of the clearance allowing the laminar flow to pass therethrough. Therefore, if the relatively wide space between the sliding surfaces continuously extends in a direction of the flow of lubricating oil, the flow resistance to the lubricating oil passing through the relatively wide space will be remarkably reduced. In this embodiment, the relationship between average value d of maximum diameters of dimples 11 of the one sliding surface and average value L of minimum distances between dimples 11 of the other sliding surface is represented by d<L. Owing to the relationship d<L between average value d and average value L, dimples 11 of the one sliding surface can be prevented from being connected with each other via dimples 11 of the other sliding surface. Therefore, the relatively wide space is not formed between the sliding surfaces which continuously extends in every direction. A large amount of the lubricating oil is allowed to flow through a relatively narrow space formed by opposed base surfaces 10 of the sliding surfaces. The flow resistance to the lubricating oil passing through the relatively narrow space is increased. On the other hand, shear force of the lubricating oil is decreased at dimples 11. As a result, the sliding surfaces having the above-described microstructure can maintain the minimum clearance therebetween which is required for assuring a suitable thickness of the lubricating oil film and suppress increase in shear force of the lubricating oil at roughness peaks of the sliding surfaces while reducing the shear force at dimples 11. This can reduce friction loss between the sliding elements.

Figure 2A:
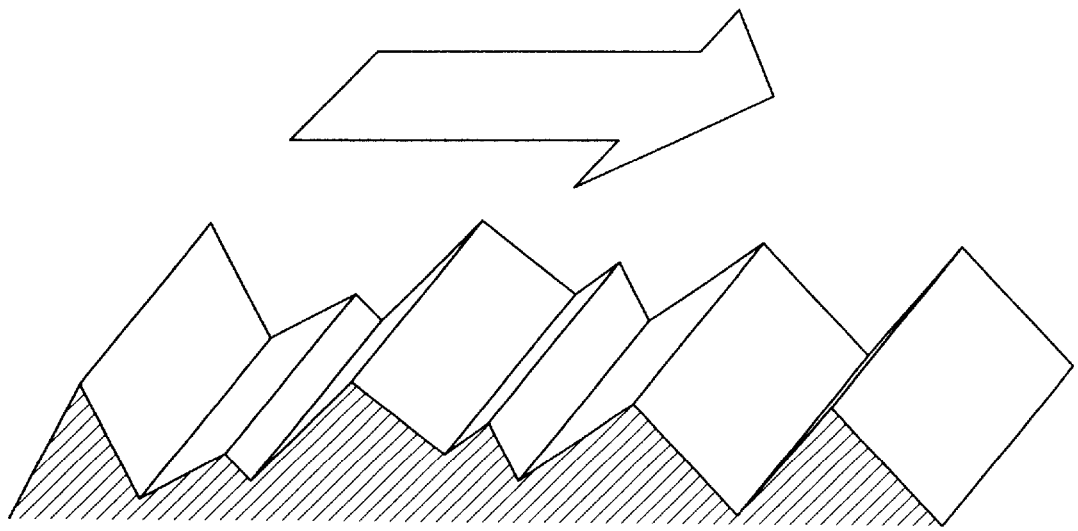
FIGS. 2A and 2B are models of a microscopic surface configuration of the sliding surface of FIGS. 1A–1C, showing a two-dimensional roughness configuration and a laminar flow of lubricating oil.
Figure 2B:
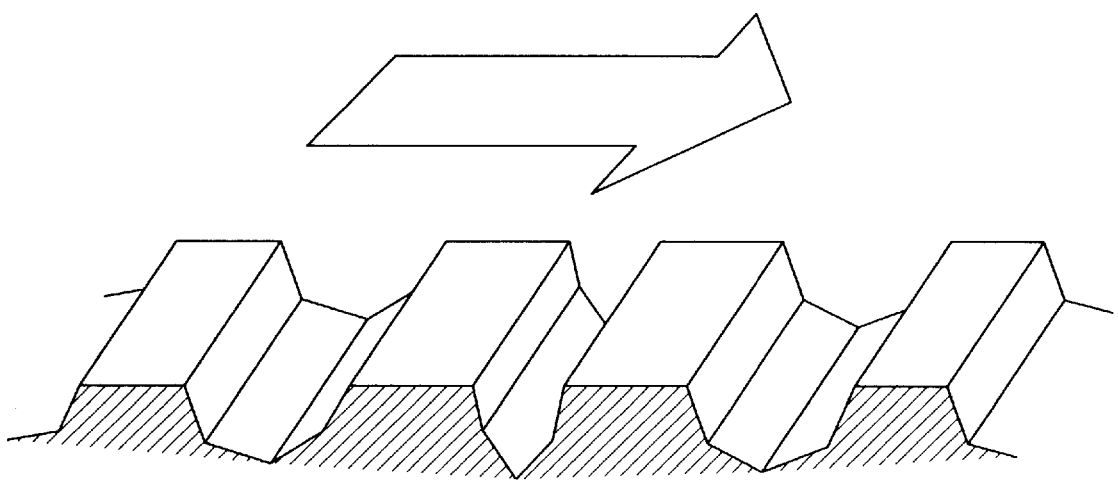

Quantitative studies of the effect of reduction of friction loss are discussed hereinafter. When the above-described relationship d<L between average value d and average value L exists, the lubricating oil flow is forced to pass through the relatively narrow space between base surfaces 10 of the sliding surfaces as explained above. Flow resistance to the lubricating oil passing through the space is calculated using a model of a microscopic surface configuration, shown in FIG. 2A, of the sliding surface. In FIG. 2A, a two-dimensional roughness configuration is shown by hatching and a laminar flow is shown by arrow. The flow resistance to the lubricating oil can be determined to approximate to flow resistance to the laminar flow crossing the microscopic irregularities of the sliding surface of FIG. 2A. The flow resistance to the lubricating oil is calculated in terms of roughness configurations of the sliding surfaces to obtain the clearance between the sliding surfaces. The clearance can be determined assuming that the flow resistance to the lubricating oil passing therethrough is substantially equal to the flow resistance generated when the lubricating oil film having a thickness of a predetermined value is formed between the theoretically completely smooth surfaces. Here, if the roughness configuration of base surface 10 of the sliding surface is a three-dimensionally random configuration, the flow resistance to the lubricating oil flowing along base surface 10 can be determined to approximate to the flow resistance generated when base surface 10 is smooth as shown in FIG. 2B. Therefore, the clearance between the sliding surfaces can be determined as the clearance between the smooth base surfaces of the sliding surfaces.

Figure 3:
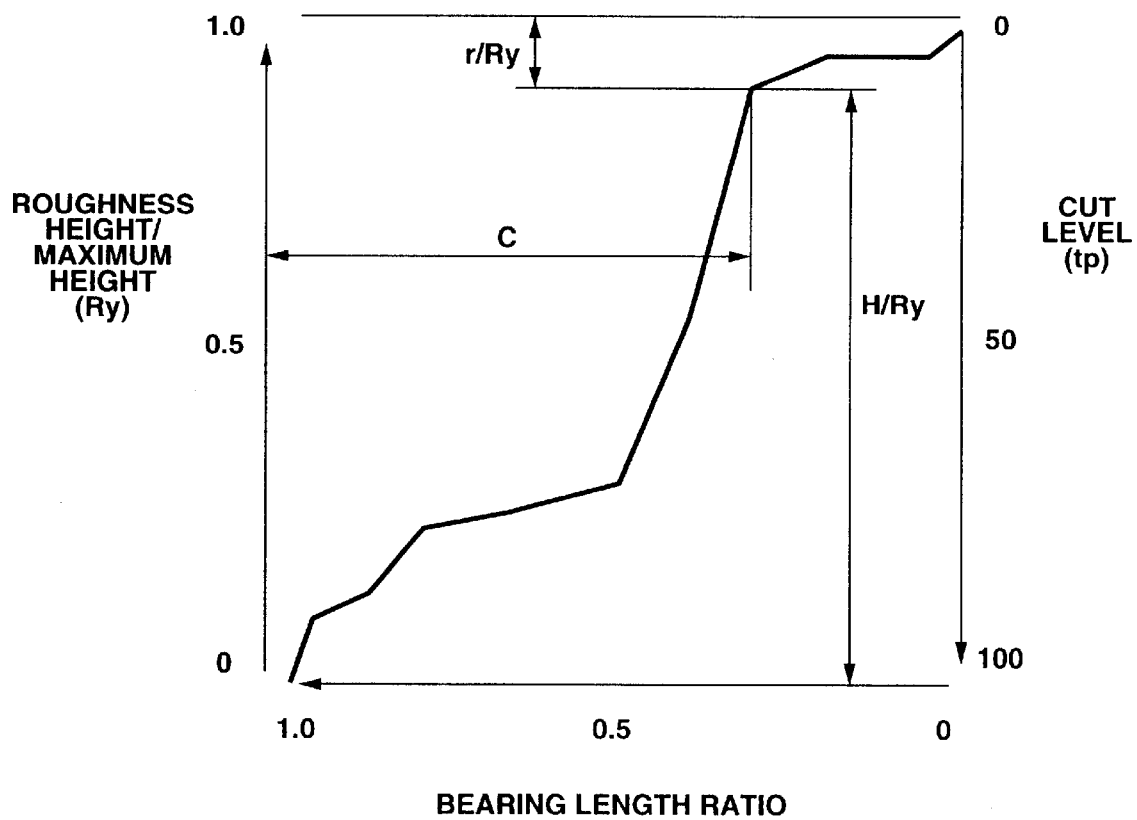
FIG. 3 is a graph showing a relationship between roughness height and cumulative distribution of roughness height of a composite roughness configuration.

Further, friction loss caused upon relative sliding motion of the sliding surfaces can be determined substantially in proportion to a surface integral of an inverse number of a clearance between the sliding surfaces, namely, a surface integral of an inverse number of a thickness of a lubricating oil film formed between the sliding surfaces. Here, a roughness configuration of each of the sliding surfaces which is defined by both of base surface 10 and dimples 11 is considerably influenced for the inverse number of the thickness of the lubricating oil film. Therefore, the inverse number of the thickness of the lubricating oil film is calculated relative to a composite roughness configuration defined by cooperation of base surface 10 and dimples 11. Cumulative distribution of roughness height of the composite roughness configuration is shown in FIG. 3, which is calculated on the basis of Abbot-Firestone Curve using parameters relating to base surface 10 and dimples 11. Abbot-Firestone Curve is described in ISO 4287:1997 and DIN 4762 which are hereby incorporated by reference.

Parameters are as follows:
r: roughness height of base surface 10
Ry: maximum height of the roughness of base surface 10
H: depth of dimples 11
C: ratio of a sum of opening areas of dimples 11 to unit surface area of the sliding surface.

The reason for reducing friction loss in this embodiment is explained as follows. Flow resistance to the lubricating oil is inversely proportional to cube of the clearance allowing the lubricating oil to pass therethrough. The sliding surfaces of the sliding elements of the sliding structure of this embodiment are SO constructed as to force the lubricating oil to pass through the narrow space between base surfaces 10 and increase flow resistance to the lubricating oil passing through the narrow space, as described above. Owing to the increase of flow resistance to the lubricating oil, a minimum clearance between the sliding surfaces is not greatly reduced. Here, a clearance between the sliding surfaces is determined as the minimum clearance when the flow resistance to the lubricating oil passing through the clearance is equal to flow resistance to the lubricating oil passing through a clearance between the theoretically completely smooth surfaces if the sliding surfaces are the theoretically completely smooth surfaces. On the other hand, the flow resistance to the lubricating oil decreases at dimples 11, whereby dimples 11 influence the minimum clearance to decrease below the clearance between the theoretically completely smooth surfaces. Meanwhile, shear rate (the product of an inverse number of clearance between the sliding surfaces and a relative velocity of the sliding surfaces) of the lubricating oil is reduced by dimples 11. The effect of reduction of shear rate of the lubricating oil by dimples 11 is largely exhibited as compared with the influence for decrease of the minimum clearance by dimples 11. This causes reduction of the total friction loss between the sliding elements. If roughness height r of base surface 10 increases, the effect of reduction of flow resistance to the lubricating oil and the influence for decrease of the minimum clearance by dimples 11 will exceed the effect of reduction of shear rate of the lubricating oil by dimples 11. Consequently, friction between the sliding surfaces will increase. Friction varies in inversely proportional to the clearance between the sliding surfaces. Therefore, if roughness height r of base surface 10 is closer to the thickness of the lubricating oil film formed between the sliding surfaces, the friction caused between the sliding surfaces will be influenced to increase. It is understood that friction loss between the sliding elements can be reduced if a surface integral of an inverse number of the first clearance between the sliding surfaces is smaller than a surface integral of an inverse number of the second clearance between the sliding surfaces assumed to be the theoretically completely smooth surfaces under condition that the flow resistance to the lubricating oil leaking from the first clearance is equal to the flow resistance to the lubricating oil leaking from the second clearance with respect to pressure gradient in the leakage direction of the lubricating oil.

Further, it is understood that if there exists the above-described relationship d<L between average value d and average value L when the sum of maximum heights t of the microscopic irregularities of base surface 10 is smaller than the thickness of the lubricating oil film formed between the sliding surfaces, the larger the surface area and the depth of each dimple 11 become within predetermined limits described above, the more the friction loss can be reduced. The predetermined limit of the opening area of dimple 11 is set on the basis of the maximum diameter of dimple 11 which is smaller than a minimum length between two opposed ends of each of the sliding surfaces. The lubricating oil film is formed over the minimum length. If the opening area of dimple 11 exceeds the predetermined limit, the above-described effects of dimples 11 cannot be obtained. The predetermined limit of the depth of each dimple 11 is a limit value in which the reduction of friction can be achieved. If each dimple 11 has an extremely large volume, compressive property of the lubricating oil will affect the minimum clearance between the sliding surfaces.

Further, the shape of dimples 11 is not limited to the generally part-spherical shape described above and it may be various shapes including an irregular shape. The same effects of dimples can be obtained irrespective of the shape of dimples.

Furthermore, if there exists the above-described relationship d<L between average value d and average value L, a hardness of the one sliding surface may be set greater than a hardness of the other sliding surface. In such a case, dimples 11 of the one sliding surface can be prevented from being eliminated from the one sliding surface even when the other sliding surface suffers from abrasion caused by direct contact between the sliding surfaces. Average-value L of the minimum distances between dimples 11 of the other sliding surface, therefore, can be set smaller, so that a ratio of a sum of the opening areas of dimples 11 of the other sliding surface to unit surface area thereof can be set larger. Namely, in a case where there exists the above-described relationship d<L, average value d of the maximum diameters of dimples 11 of the one sliding surface may be set smaller than average value D of the maximum diameters of dimples 11 of the other sliding surface. As a result, the time required until dimples 11 are abraded off can be prolonged, whereby the effect of reduction of friction can be obtained for a relatively long period. Further, if the hardness of the one sliding surface is greater than the hardness of the other sliding surface, maximum height t of the microscopic irregularities of base surface 10 of the one sliding surface may be set smaller than minimum clearance MIC, and maximum height t of the microscopic irregularities of base surface 10 of the other sliding surface may be set larger than minimum clearance MIC. In this case, maximum heights t of the microscopic irregularities of base surfaces 10 are adjusted such that the sum of maximum heights t of the microscopic irregularities of base surfaces 10 becomes smaller than minimum clearance MIC by initial wearing caused upon the starting operation of relative sliding motion of the sliding elements.

Figure 9A:
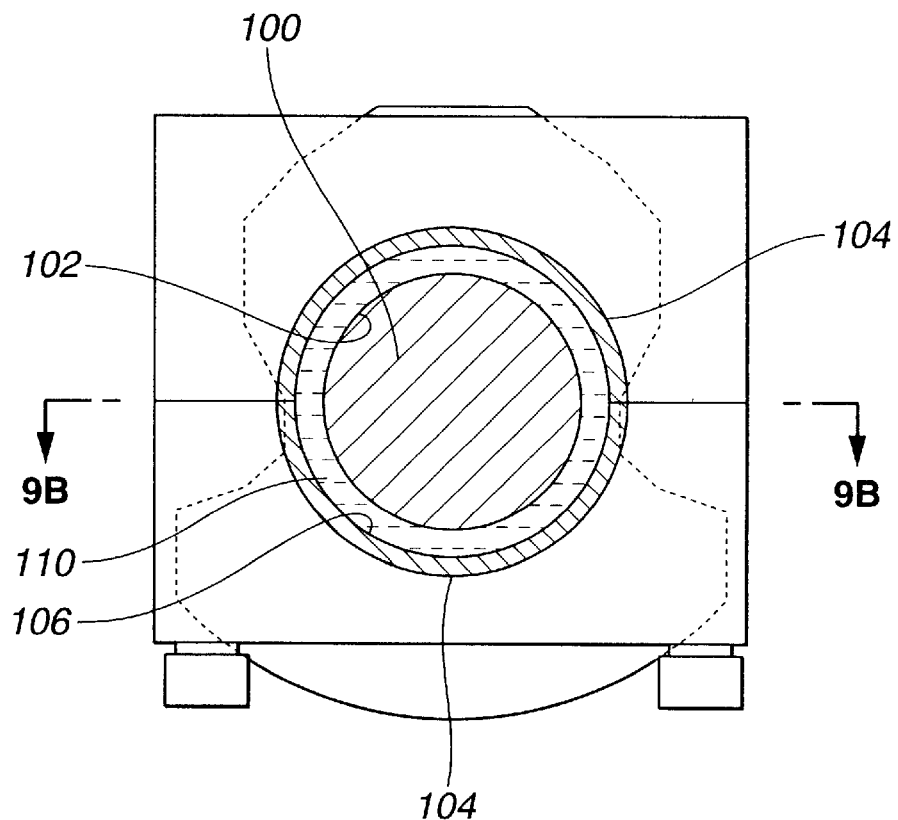
FIG. 9A shows a crankshaft and a bearing metal.
Figure 9B:
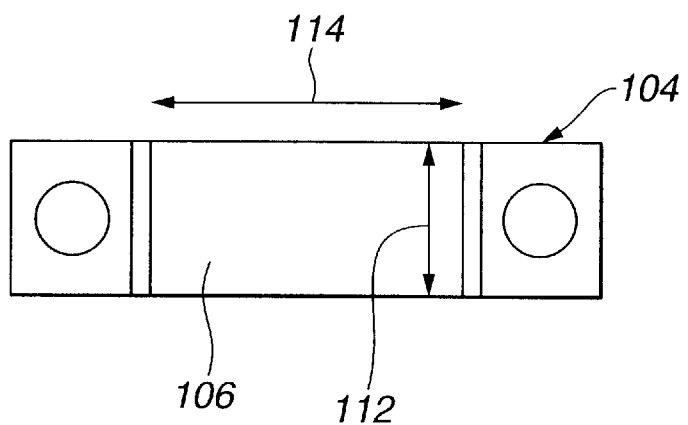
FIG. 9B is a sectional view of the bearing metal, taken along line 9B—9B of FIG. 9A.

The sliding structure of this embodiment are applicable to the combination of a crankshaft and a bearing metal of a reciprocating internal combustion engine for automobiles. FIGS. 9A and 9B show typical examples of the crankshaft and the corresponding bearing metal. As illustrated in FIG. 9A, crankshaft 100 has sliding surface 102 opposed to sliding surface 106 of bearing metal 104. Sliding surfaces 102 and 106 are lubricated with the lubricating oil. Lubricating oil film 110 is formed in a clearance between sliding surfaces 102 and 106. In FIG. 9B, reference numeral 112 indicates the minimum length of sliding surface 106 which extends between opposed axial ends of bearing metal 104 which is shorter than peripheral length 114 thereof.

In the crankshaft and the bearing metal of the reciprocating internal combustion engine for automobiles, relative velocity of the sliding motion will exceed 20 m/s upon the maximum revolution of the engine. In such the condition, there will occur frictional heat in the lubricating oil, which causes a temperature thereof to rise up. This will decrease viscosity of the lubricating oil, whereby the thickness of the lubricating oil film formed between the crankshaft and the bearing metal will be reduced. The crankshaft and the bearing metal will be elastically deformed because of inertial force applied thereto, and then be brought into direct contact with each other. With provision of the above-described dimples 11 on the sliding surfaces of the crankshaft and the bearing metal, a certain volume of the lubricating oil can be retained by dimples 11, so that the sliding surfaces can be locally cooled. This can assure antiseizure properties of the crankshaft and the bearing metal. Further, even if foreign matters enter into the clearance between the crankshaft and the bearing metal, dimples 11 can trap the foreign matters to thereby prevent the direct contact between the crankshaft and the bearing metal.

The amount of the lubricating oil introduced into the clearance between the sliding surfaces of the crankshaft and the bearing metal is balanced with the amount of the lubricating oil discharged therefrom assuming that the sliding surfaces are the theoretically completely smooth surfaces and that the thickness of the lubricating oil film formed between the clearance between the theoretically completely smooth surfaces is 2 $\mu$m under the above-described ordinary operating condition of the engine. When the crankshaft of the reciprocating internal combustion engine for automobiles is operated under high-speed and high-temperature condition, the thickness of the lubricating oil film becomes smaller than the thickness thereof formed under the ordinary operating condition of the engine. In the case of forming dimples 11 on the sliding surface of the crankshaft of the reciprocating internal combustion engine for automobiles, actual viscosity of the lubricating oil can be increased by the cooling effect of dimples 11, so that wear resistance of the crankshaft can be improved.

Figure 10:
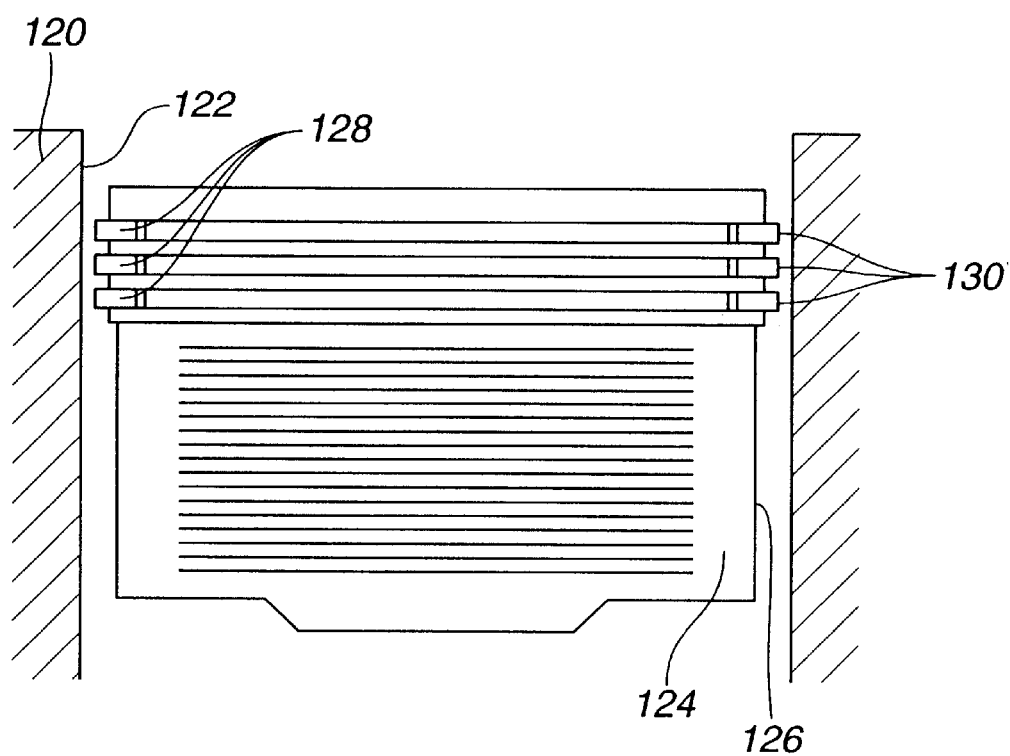
FIG. 10 shows a cylinder wall, a piston skirt and piston rings.

The sliding structure of the first embodiment are also applicable to the combination of a cylinder wall and a piston skirt of an internal combustion engine, and to the combination of a cylinder wall and a piston ring thereof. FIG. 10 illustrates typical examples of the cylinder wall and the corresponding piston skirt and piston rings reciprocally moveable relative to the cylinder wall. As illustrated in FIG. 10, cylinder wall 120 has sliding surface 122 opposed to sliding surface 126 of piston skirt 126. Sliding surface 122 is also opposed to sliding surfaces 130 of piston rings 128 mounted to piston skirt 126.

In a case where the cylinder wall and the corresponding piston skirt, and the cylinder wall and the corresponding piston ring are provided with the sliding surfaces of the first embodiment, the effect of reduction of friction loss can be obtained as described above. At top and bottom dead centers of the piston stroke, the piston skirt stops the sliding motion relative to the cylinder wall, and formation of the lubricating oil film is deteriorated. In this condition, the thickness of the lubricating oil film between the piston skirt and the cylinder wall will decrease, and the direct contact therebetween tends to occur. With provision of dimples 11, even in such a circumstance, the sliding surfaces can be locally cooled and continuously supplied with the lubricating oil at the portion where the boundary film of the lubricating oil is broken. This can improve wear resistance and anti-scuffing properties of the piston skirt and the cylinder wall.

In a reciprocating internal combustion engine for automobiles, the thickness of the lubricating oil film formed between the piston skirt and the cylinder wall is approximately 8 μm at a mid-position of the piston stroke under the ordinary operating condition of the engine. At the mid-position of the piston stroke, the sliding speed of the piston is relatively high and the thickness of the lubricating oil film is relatively large. The thickness of the lubricating oil film formed between the piston ring and the cylinder wall is approximately 1 μm at the mid-position of the piston stroke. The sliding structure of the first embodiment also can be applied to the cylinder wall and the piston skirt of the reciprocating internal combustion engine for automobiles and to the cylinder wall and the piston ring thereof. In such a case, the effect of reduction of friction loss can be obtained.

Next, a modification of the sliding structure of the first embodiment is explained, which is used in the cylinder wall, the piston skirt and the piston ring of the reciprocating internal combustion engine. Average value d of the maximum diameters of dimples 11 of the sliding surfaces of the cylinder wall and the piston ring is not more than an axial length of the piston ring. A relationship between average value d of the maximum diameters of dimples 11 of the sliding surface of the cylinder wall, average value LS of the minimum distances between dimples 11 of the sliding surface of the piston skirt, and average value LR of the minimum distances between dimples 11 of the sliding surface of the piston ring is expressed as follows: d<LS and d<LR. Maximum height t of the microscopic irregularities of base surface 10 is smaller than a smaller one of minimum clearance MIC1 between the sliding surfaces of the cylinder wall and the piston skirt and minimum clearance MIC2 between the sliding surfaces of the cylinder wall and the piston ring. Minimum clearances MIC1 and MIC2 are determined assuming that the respective sliding surfaces of the cylinder wall, the piston skirt and the piston ring are the theoretically completely smooth surfaces described above, and that an amount of the lubricating oil introduced into minimum clearances MIC1 and MIC2 upon relative motion of the cylinder wall, the piston skirt and the piston ring balances with an amount of the lubricating oil discharged from minimum clearances MIC1 and MIC2 by pressure being generated between the cylinder wall, the piston skirt and the piston ring under a maximum operating time condition of the reciprocating internal combustion engine.

In the reciprocating internal combustion engine, friction is suppressed at the mid-position of the piston stroke because of the relatively large thickness of the lubricating oil film formed thereat as described above. Therefore, even if dimples 11 having a relatively small size are formed on the sliding surface of the cylinder wall, dimples 11 will be hardly eliminated from the sliding surface due to friction. Accordingly, the ratio of a sum of the opening areas of dimples 11 of the sliding surface of each of the piston ring and the piston skirt to unit surface area of the sliding surface thereof can be increased as long as maintaining the above-described relationship, i.e., d<LS and d<LR, between average value d, average value LS, and average value LR. The effect of reduction of friction loss can be obtained for a relatively long period even when dimples 11 of the sliding surfaces of the piston ring and the piston skirt are abraded to be smaller because of friction.

Figure 7A:
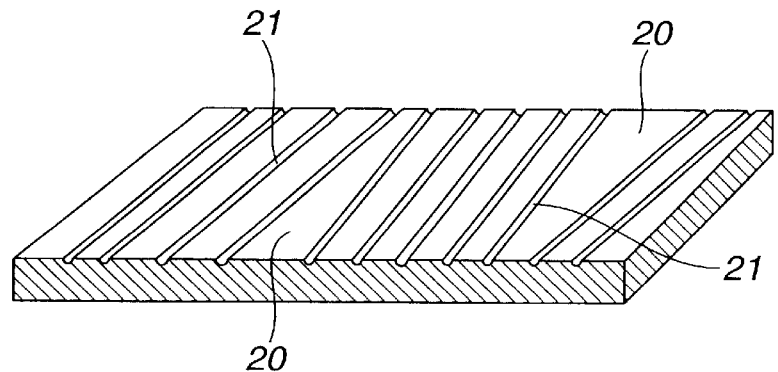
FIG. 7A is a schematic perspective view of a microstructure of a sliding surface of sliding elements of the sliding structure of a second embodiment, according to the present invention, showing a base surface and grooves.
Figure 7B:
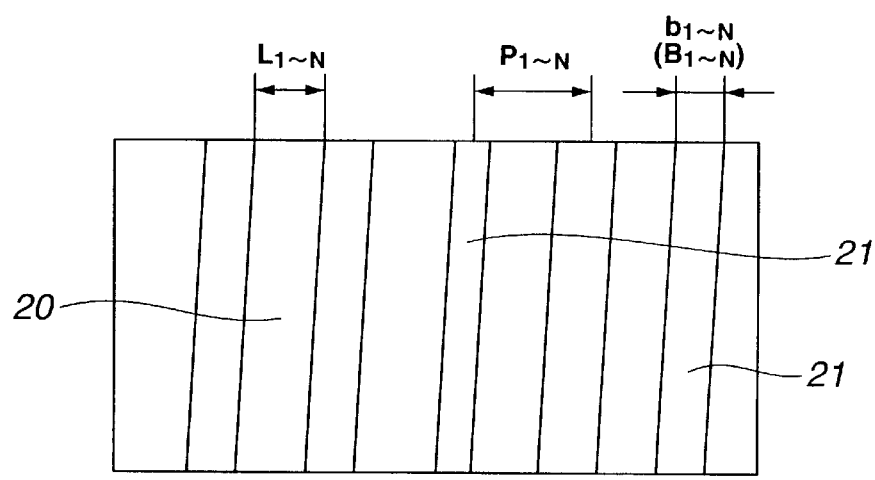
FIG. 7B is a schematic plan view of the microstructure shown in FIG. 7A.
Figure 7C:
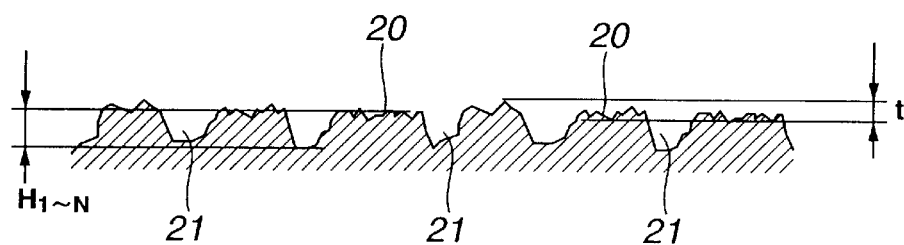
FIG. 7C is a schematic sectional view of the microstructure shown in FIG. 7A.

Referring now to FIGS. 7A–7C, a second embodiment of the sliding structure of the present invention is explained. The second embodiment differs from the first embodiment in the microstructure of the sliding surfaces of the sliding elements in which grooves 21 are formed instead of dimples 11. The microstructure of each of the sliding surfaces is shown in FIGS. 7A–7C. As illustrated in FIG. 7A, the sliding surface includes base surface 20 and a plurality of microscopic grooves 21. Base surface 20 has microscopic irregularities, namely, recesses and projections, having maximum height t as shown in FIG. 7C. Maximum height t is represented in terms of maximum height Ry prescribed in JIS B 0601-1994. If the number of grooves 21 are indicated by 1 to N, grooves 21 have maximum width $b_{1-N}$ shown in FIG. 7B and maximum depths $H_{1-N}$ shown in FIG. 1C. Minimum distances between adjacent grooves 21 are indicated at $L_{1-N}$ shown in FIG. 7B, and pitch thereof is indicated at $P_{1-N}$ shown in FIG. 1B. Average value H of maximum depths $H_{1-N}$ is larger than maximum height t. Maximum widths $b_{1-N}$ of grooves 21 are not more than contact length CL in the direction of the sliding motion over which the sliding surfaces are in contact with each other via a lubricating oil film disposed therebetween. Average value b of maximum widths $b_{1-N}$ of grooves 21 of one of the sliding surfaces is smaller than average value L of minimum distances $L_{1-N}$ between grooves 21 of the other of the sliding surfaces.

In the second embodiment, there exists the same relationship T<Tsmooth as described in the first embodiment, between first surface integral T of the inverse number of the first clearance between the sliding surfaces and second surface integral Tsmooth of the inverse number of the second clearance between the theoretically completely smooth surfaces.

Further, assuming that the sliding surfaces are the theoretically completely smooth surfaces defining minimum clearance MIC as described in the first embodiment, minimum clearance MIC is larger than maximum height t of the microscopic irregularities of base surface 20. In this case, friction loss can be reduced.

As explained in the first embodiment, the thickness of the lubricating oil film formed between the sliding surfaces to which load is applied, is determined depending on the balance between an amount of the lubricating oil introduced into the clearance between the sliding surfaces upon relative motion of the sliding surfaces and an amount of the lubricating oil discharged from the clearance due to pressure caused by the load. When the lubricating oil is discharged from the clearance between the sliding surfaces of this embodiment, a large amount of the lubricating oil is allowed to pass through the relatively narrow space between opposed base surfaces 20 of the sliding surfaces. Grooves 21 of the one sliding surface can be prevented from being connected with each other via grooves 21 of the other sliding surface on the basis of the above-described relationship b<L between average value b and average value L. The flow resistance to the lubricating oil discharged from the relatively narrow space is increased. On the other hand, shear force of the lubricating oil is reduced at grooves 21. Similarly to the sliding structure of the first embodiment, the sliding structure of the second embodiment can maintain the minimum clearance therebetween which is required for assuring a suitable thickness of the lubricating oil film and suppress increase in shear force of the lubricating oil at roughness peaks of the sliding surfaces while reducing the shear force at grooves 21. This can reduce friction loss between the sliding elements.

Figure 8A:
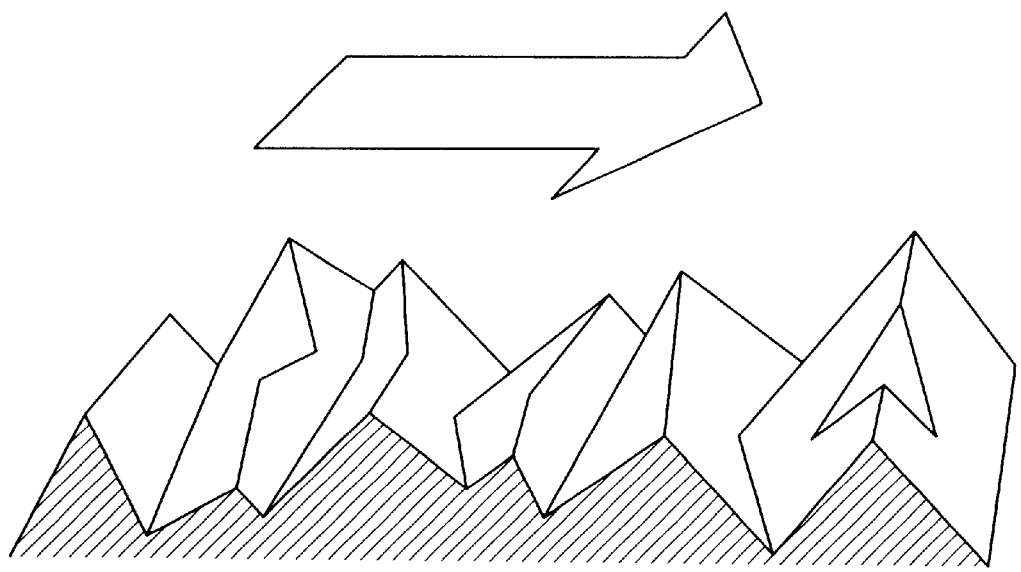
FIGS. 8A and 8B are models of a microscopic surface configuration of the sliding surface of FIGS. 7A–7C, showing a two-dimensional roughness configuration and a laminar flow of lubricating oil.
Figure 8B:
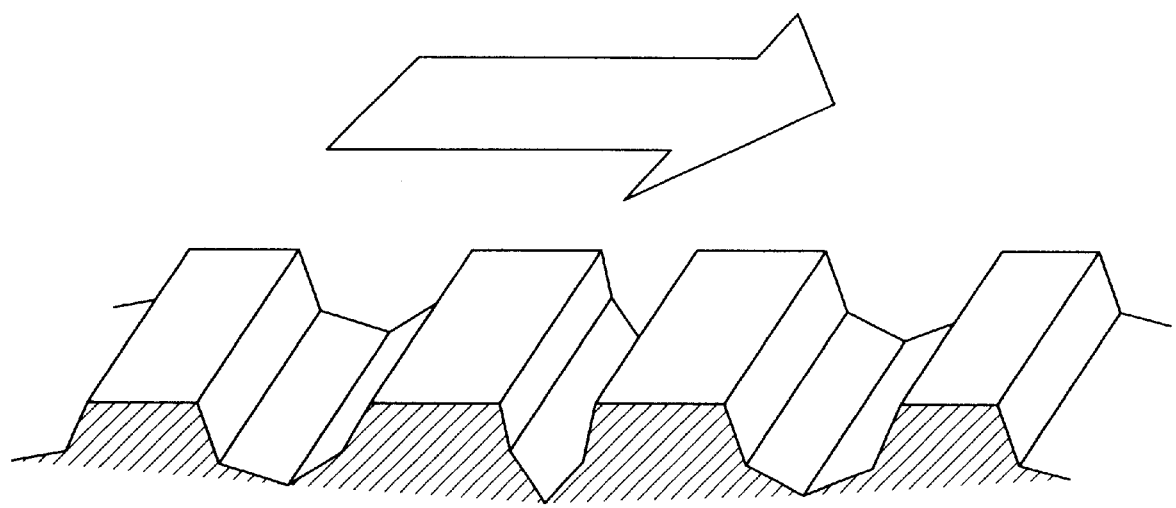

Substantially the same quantitative studies of the effect of reduction of friction loss as those in the first embodiment are discussed. In the second embodiment, there exists the above-described relationship b<L between average value b and average value L, so that the lubricating oil is forced to pass through the relatively narrow space between base surfaces 20 of the sliding surfaces. Flow resistance to the lubricating oil passing through the narrow space is calculated using a model of a microscopic surface configuration, shown in FIG. 8A, of the sliding surface. FIG. 8A shows a two-dimensional roughness configuration and a laminar flow, similarly to that of FIG. 2A. The flow resistance to the lubricating oil can be determined to approximate to flow resistance to the laminar flow crossing the microscopic irregularities of the sliding surface of FIG. 8A. If the roughness configuration of base surface 20 of the sliding surface is a three-dimensionally random configuration, the flow resistance to the lubricating oil flowing along base surface 20 can be determined to approximate to the flow resistance generated when base surface 20 is smooth as shown in FIG. 8B. The clearance between the sliding surfaces can be determined as the clearance between the smooth base surfaces of the sliding surfaces.

As described in the first embodiment, friction loss caused upon relative sliding motion of the sliding surfaces can be determined substantially in proportion to a surface integral of an inverse number of a clearance between the sliding surfaces, namely, a surface integral of an inverse number of a thickness of a lubricating oil film formed between the sliding surfaces. Since a roughness configuration of each of the sliding surfaces which is defined by both of base surface 20 and grooves 21 is considerably influenced for the inverse number of the thickness of the lubricating oil film, the inverse number of the thickness of the lubricating oil film is calculated relative to a composite roughness configuration defined by cooperation of base surface 20 and grooves 21. Cumulative distribution of roughness height of the composite roughness configuration is shown in FIG. 3, similarly to in the first embodiment.

The reason for reducing friction loss in the second embodiment is substantially the same as that described in the first embodiment. In the second embodiment, the lubricating oil is forced to pass through the narrow space between base surfaces 20 of the sliding surfaces. Flow resistance to the lubricating oil passing through the narrow space increases. Similarly to dimples 11 in the first embodiment, the effect of reduction of shear rate of the lubricating oil by grooves 21 is largely exhibited as compared with the influence for decrease of the minimum clearance between the sliding surfaces by grooves 21. This causes reduction of the total friction loss between the sliding elements. If roughness height r of base surface 20 increases, the influence for decrease of the minimum clearance by grooves 21 will exceed the effect of reduction of shear rate of the lubricating oil by grooves 21. The friction caused between the sliding surfaces will increase. Further, friction loss can be reduced if there exists the same relationship as described in the first embodiment, between a surface integral of an inverse number of the first clearance between the sliding surfaces and a surface integral of an inverse number of the second clearance between the sliding surfaces assumed to be the theoretically completely smooth surfaces.

Furthermore, it is understood that if there exists the above-described relationship b<L between average value b and average value L when the sum of maximum heights t of the microscopic irregularities of base surface 20 is smaller than the thickness of the lubricating oil film formed between the sliding surfaces, the larger the opening area and the depth of each dimple 11 become within predetermined limits, the more the friction loss can be reduced. The predetermined limit of the opening area of dimple 11 is set on the basis of the maximum diameter of dimple 11 which is smaller than a minimum length between two opposed ends of each of the sliding surfaces. The lubricating oil film is formed over the minimum length. If the opening area of dimple 11 exceeds the predetermined limit, the above-described effects of dimples 11 cannot be obtained. The predetermined limit of the depth of dimple 11 is a limit value in which the reduction of friction can be achieved. If dimple 11 has an extremely large volume, compressive property of the lubricating oil will affect the minimum clearance between the sliding surfaces.

In addition, if there exists the above-described relationship b<L between average value b of the maximum widths of grooves 21 of one sliding surface and average value L of the minimum distances between grooves 21 of the other sliding surface, a hardness of the one sliding surfaces may be set greater than a hardness of the other of the sliding surfaces. In this case, grooves 21 of the one sliding surface can be prevented from being eliminated from the one sliding surface even when the other sliding surface is abraded due to direct contact between the sliding surfaces. Therefore, average value L of the minimum distances between grooves 21 of the other sliding surface can be set smaller. A ratio of a sum of the opening areas of grooves 21 of the other sliding surface to unit surface area thereof can be set larger. Namely, average value b of the maximum widths of grooves 21 of the one sliding surface can be set smaller than average value B of the maximum widths of grooves 21 of the other sliding surface. As a result, the time required until grooves 21 are abraded off can be prolonged, whereby the effect of reduction of friction can be obtained for a relatively long period. Furthermore, if the hardness of the one sliding surface is greater than the hardness of the other sliding surface, maximum height t of the microscopic irregularities of base surface 20 of the one sliding surface may be set smaller than minimum clearance MIC, and maximum height t of the microscopic irregularities of base surface 20 of the other sliding surface may be set larger than minimum clearance MIC. In this case, maximum heights t of the microscopic irregularities of base surfaces 20 are adjusted such that the sum of maximum heights t of the microscopic irregularities of base surfaces 20 becomes smaller than minimum clearance MIC by initial wearing caused upon the starting operation of relative sliding motion of the sliding elements.

A modification of the sliding structure of the second embodiment now is explained, which is used in the cylinder wall, the piston skirt and the piston ring of the reciprocating internal combustion engine for automobiles as described above. Grooves 21 of the sliding surface of the cylinder wall have average value b of the maximum widths which is smaller than average value L of the minimum distances of grooves 21 of the sliding surface of the piston skirt. A relationship between the average value b of the maximum widths of grooves 21 of the sliding surface of the cylinder wall, average value LGC of minimum distances between grooves 21 of the sliding surface of the cylinder wall, and contact length CL over which the sliding surfaces of the cylinder wall and the piston ring are in contact with each other is expressed as follows: b+LGC<CL. Maximum height t of the microscopic irregularities of base surface 20 of each of the sliding surfaces of the cylinder wall, the piston skirt and the piston ring is not more than a smaller one of minimum clearance MIC1 between the sliding surfaces of the cylinder wall and the piston skirt and minimum clearance MIC2 between the sliding surfaces of the cylinder wall and the piston ring. Here, minimum clearances MIC1 and MIC2 are determined assuming that the sliding surfaces of the cylinder wall, the piston skirt and the piston ring are the above-described theoretically completely smooth surfaces, and that an amount of the lubricating oil introduced into minimum clearances MIC1 and MIC2 upon relative motion of the cylinder wall, the piston skirt and the piston ring balances with an amount of the lubricating oil discharged from minimum clearances MIC1 and MIC2 by pressure generated between the cylinder wall, the piston skirt and the piston ring under a maximum operating time condition of the reciprocating internal combustion engine.

The sliding surface of the piston ring has no grooves such as grooves 21 of the sliding surface of the piston skirt. However, assuming that the sliding surface of the piston ring has grooves between which an infinite distance exists and that average value L of minimum distances between the grooves of the sliding surface of the piston ring is infinite, average value b of the maximum widths of grooves 21 of the sliding surface of the cylinder wall is regarded smaller than the average value L of the minimum distances of the grooves of the sliding surface of the piston ring. The friction loss between the cylinder wall and the piston ring and between the cylinder wall and the piston skirt can be reduced. In this modification, the effect of reduction of friction loss can be obtained for a relatively long period on the basis of the relationship b<L and the relationship b+LGC<CL as described above.

As explained above, the sliding elements of the sliding structure of the present invention have the sliding surfaces including the base surfaces and the microscopic dimples or grooves which are so constructed as to suppress reduction of flow resistance to the lubricating oil passing through a clearance between the sliding surfaces and maintain a thickness of the lubricating oil film between the sliding surfaces which is required for reducing friction loss between the sliding elements. The sliding elements are used in a reciprocating internal combustion engine, including the combination of a crankshaft and a bearing metal, the combination of a cylinder wall and a piston skirt, the combination of a cylinder wall and a piston ring, and the like. This can serve for increasing power efficiency of the engine.

EXAMPLES

The present invention is described in more detail by way of examples by referring to the accompanying drawings. However, these examples are only illustrative and not intended to limit a scope of the present invention thereto.

Example 1

A crankshaft and a bearing metal were prepared, which were used in an internal combustion engine for automobiles having a piston displacement of approximately 2000 cc and a maximum revolution number of 6000 rpm. The lubricating oil film having a thickness of 2 μm was formed under the ordinary operating condition of the engine in which the revolution number was 2000 rpm and the load was ¼. The sliding surfaces of the crankshaft and the bearing metal were formed as follows. The crankshaft made of steel and having a Vickers hardness of approximately Hv 500 was subjected to grinding by means of a lapping tape to form a base surface as indicated at 10 in FIGS. 1A–1C, of the sliding-surface. The base surface was an extremely smooth surface formed with microscopic intersecting grooves. The base surface had a surface roughness having an average roughness of 0.08 μm in terms of arithmetical mean roughness Ra prescribed in JIS B 0601-1994 and a maximum height of 0.5 μm in terms of Ry prescribed in JIS B 0601-1994. The base surface then was subjected to irradiation with a pulsed laser beam using a YAG laser. Fine dimples as indicated at 11 in FIGS. 1A–1C were formed on the base surface. The dimples had a generally part-spherical shape and maximum depths $k_{1-N}$ ranging from 3 μm to 5 μm (average value k=4 μm), and maximum diameters $d_{1-N}$ ranging from 10 μm to 30 μm (average value d=20 μm). A ratio of a sum of opening areas of the dimples to unit surface area of the sliding surface was 30–80%.

The bearing metal made of aluminum alloy and having a Vickers hardness of approximately Hv 100 was subjected to broaching to form a base surface as indicated at 10 in FIGS. 1A–1C, of the sliding surface. The base surface had a surface roughness represented by maximum height Ry of 1.0 μm. Dimples as indicated at 11 in FIGS. 1A–1C were formed in the same manner as described above. The dimples had a generally part-spherical shape and maximum depths $k_{1-N}$ ranging from 3 μm to 10 μm (average value k=7 μm), and maximum diameters $d_{1-N}$ ranging from 50 μm to 80 μm (average value d=60 μm). Pitches $P_{1-N}$ of the dimples were 110–180 μm, and average value P of pitches $P_{1-N}$ was 150 μm. Average value L of minimum distances $L_{1-N}$ between the dimples was 30 μm.

Figure 4:
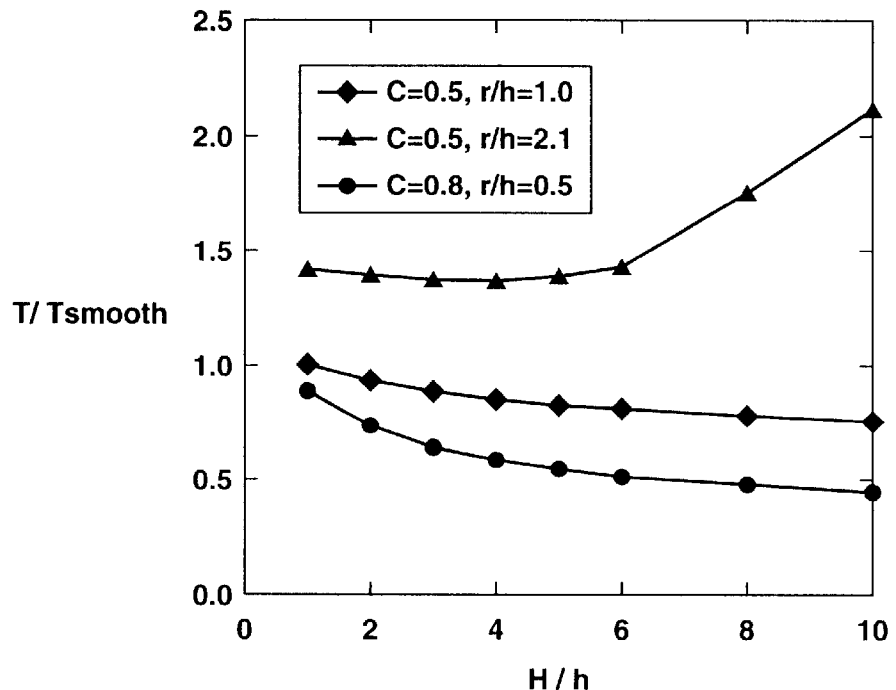
FIG. 4 is a graph showing a relationship between friction loss and ratio H/h of depth H of the dimples to thickness h of a lubricating oil film.
Figure 5:
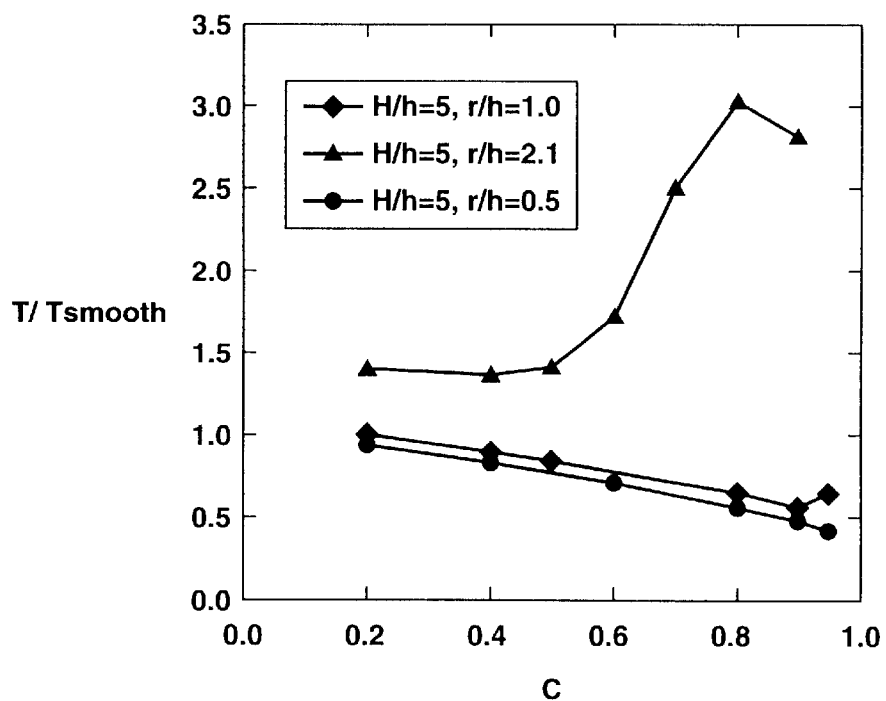
FIG. 5 is a graph showing a relationship between friction loss and ratio C of a sum of opening areas of the dimples to unit surface area of the sliding surface.
Figure 6:
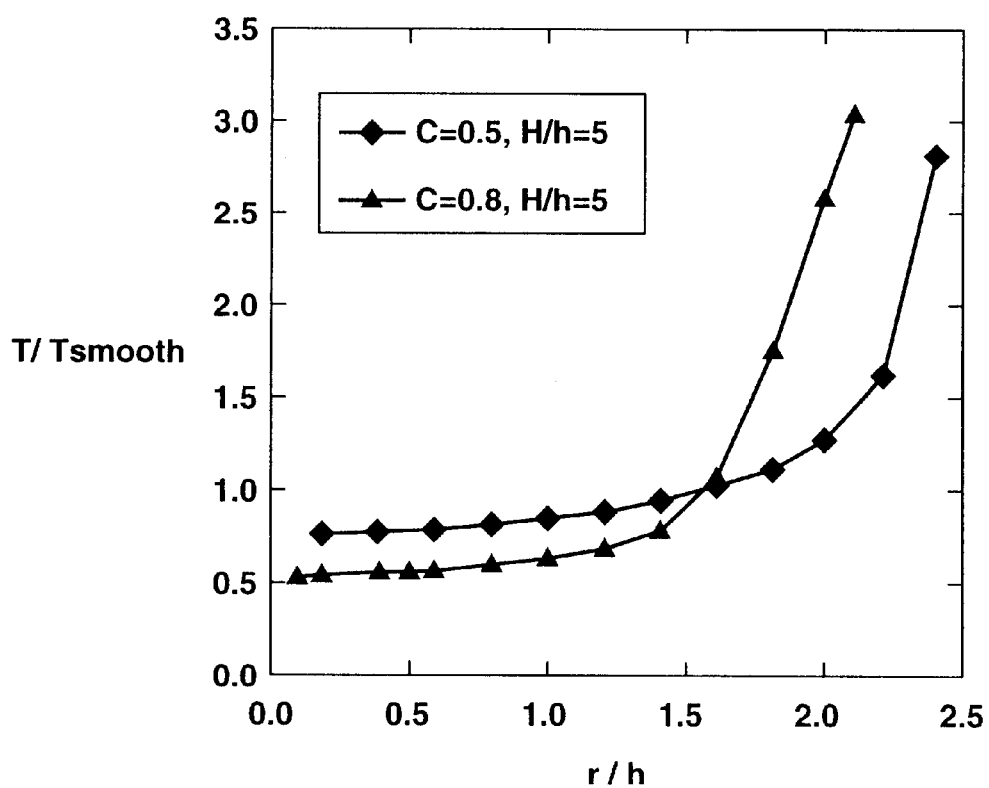
FIG. 6 is a graph showing a relationship between friction loss and ratio r/h of roughness height r of the base surface to thickness h of a lubricating oil film.

Next, ratio T/Tsmooth of surface integral T of an inverse number of the thickness of the lubricating oil film formed between the thus-formed sliding surfaces of the crankshaft and the bearing metal to surface integral Tsmooth of an inverse number of the thickness of the lubricating oil film formed between the theoretically completely smooth surfaces was calculated relative to parameters r, H, C described in the first embodiment and parameter h indicative of a thickness of the lubricating oil film. The calculation results were shown in FIGS. 4–6. FIG. 4 shows the characteristic curves of ratio T/Tsmooth relative to ratio H/h which was exhibited upon varying ratio C and ratio r/h. As indicated by ●-plotted curve of FIG. 4, when roughness height r of base surface 10 was relatively small, surface integral T decreased as depth H of dimples 11 increased. As indicated by ▲-plotted curve of FIG. 4, when roughness height r of base surface 10 was relatively large, there was shown the contrary tendency. FIG. 5 shows the characteristic curves of ratio T/Tsmooth relative to ratio C which was exhibited upon varying ratio r/h and setting ratio H/h at constant. As indicated by ●-plotted curve of FIG. 5, when roughness height r of base surface 10 was relatively small, surface integral T decreased as ratio C increased. As indicated by ▲-plotted curve of FIG. 5, when roughness height r of base surface 10 was relatively large, there was shown substantially the contrary tendency. FIG. 6 shows the characteristic curves of ratio T/Tsmooth relative to ratio r/h which was exhibited upon varying ratio C and setting ratio H/h at constant. As shown in FIG. 6, when ratio r/h was larger than a certain value, i.e., approximately 1.6, surface integral T rapidly increased. The increase in surface integral T at larger ratio C (C=0.8) indicated by ▲-plotted curve was greater than the increase in surface integral T at smaller ratio C (C=0.5) indicated by ♦-plotted curve. In Example 1, there existed the relationship d<L between average value d of the maximum diameters of the dimples of the sliding surface of the crankshaft and average value L of the minimum distances between the dimples of the sliding surface of the bearing metal. It was confirmed that friction loss between the crankshaft and the bearing metal was reduced on the basis of the relationship d<L.

Example 2

A cylinder wall, a piston skirt and a piston ring were prepared, which were used in the same internal combustion engine for automobiles as described in Example 1. At the mid-position of the piston stroke under the ordinary operating condition of the engine, the thickness of the lubricating oil film formed between the sliding surfaces of the cylinder wall and the piston skirt was approximately 8 μm, and the thickness of the lubricating oil film formed between the sliding surfaces of the cylinder wall and the piston ring was approximately 1 μm. The sliding surfaces of the cylinder wall, the piston skirt and the piston ring were formed as follows. The cylinder wall made of cast iron and having a Vickers hardness of approximately Hv 300 was subjected to honing to form a smooth base surface as indicated at 10 in FIGS. 1A–1C. The base surface was formed with microscopic intersecting grooves and had a surface roughness represented by arithmetical mean roughness Ra of 0.13 μm and maximum height Ry of 1 μm. Dimples as indicated at 11 in FIGS. 1A–1C were formed in the same manner as described in Example 1. The dimples had a generally part-spherical shape and maximum depths $k_{1-N}$ ranging from 3 μm to 5 μm (average value k=4 μm), and maximum diameters $d_{1-N}$ ranging from 10 μm to 30 μm (average value d=20 μm). Pitches $P_{1-N}$ of the dimples were in a range of 60–100 μm, and average value P of pitches $P_{1-N}$ was 80 μm. Average value L of minimum distances $L_{1-N}$ between the dimples was 30 μm.

The piston skirt made of aluminum alloy and having a Vickers hardness of approximately Hv 150 was subjected to grinding to thereby form the same base surface as that of the cylinder wall. Dimples were formed in the same manner as described in Example 1. The dimples had a generally part-spherical shape and maximum depths $k_{1-N}$ ranging from 10 μm to 15 μm (average value k 13 μm), and maximum diameters $d_{1-N}$ ranging from 50 μm to 80 μm (average value d=60 μm). Pitches $P_{1-N}$ of the dimples were in a range of 110–180 μm (average value P 150 μm). Average value L of minimum distances $L_{1-N}$ between the dimples was 30 μm.

The piston ring having a chrome plating and a Vickers hardness of approximately Hv 1000 was subjected to honing to form the same base surface as that of the cylinder wall. Dimples were formed in the same manner as described in Example 1. The dimples had a generally part-spherical shape and maximum depths $k_{1-N}$ ranging from 3 μm to 5 μm (average value k=4 μm), and maximum diameters $d_{1-N}$ ranging from 10 μm to 30 μm (average value d=20 μm). A ratio of a sum of opening areas of the dimples to unit surface area of the sliding surface was 30–80%.

The calculation of ratio T/Tsmooth was made relative to the thus-formed sliding surfaces of the cylinder wall and the piston skirt, and the thus-formed sliding surfaces of the cylinder wall and the piston ring, as described in Example 1. Substantially the same characteristic curves of ratio T/Tsmooth as those of Example 1 were obtained from the calculation results. In Example 2, there existed the relationship d<L between average value d of the maximum diameters of the dimples of the sliding surface of the cylinder wall and average value L of the minimum distances between the dimples of the sliding surface of the piston skirt. Also, there existed the relationship d<L between average value d of the maximum diameters of the dimples of the sliding surface of the piston ring and average value L of the minimum distances between the dimples of the sliding surface of the cylinder wall. It was confirmed that friction loss between the cylinder wall and the piston skirt and between the cylinder wall and the piston ring was reduced on the basis of the relationship d<L.

Example 3

A cylinder wall, a piston skirt and a piston ring made of the same materials as described in Example 2 were prepared, which were used in the same internal combustion engine for automobiles as described in Example 1. The sliding surfaces of the cylinder wall, the piston skirt and the piston ring were formed in the same manner as described in Example 2 except that the dimensions of the dimples of the sliding surface of the piston ring were as follows: pitches $P_{1-N}$ of the dimples were in a range of 60–100 μm (average value P=80 μm), and average value LR of minimum distances $L_{1-N}$ between the dimples was 30 μm. Average value d of maximum diameters $d_{1-N}$ of the dimples of the sliding surface of the cylinder wall was 20 μm. Average value LS of minimum distances $L_{1-N}$ between the dimples of the sliding surface of the piston skirt was 30 μm. The calculation of ratio T/Tsmooth was made in the same manner as described in Example 2. Substantially the same characteristic curves of ratio T/Tsmooth as those of Example 1 were obtained from the calculation results. In Example 3, there existed the relationship d<LS between average value d of the maximum diameters of the dimples of the sliding surface of the cylinder wall and average value LS of the minimum distances between the dimples of the sliding surface of the piston skirt, and at the same time, the relationship d<LR between average value d of the dimples of the sliding surface of the cylinder wall and average value LR of the minimum distances between the dimples of the sliding surface of the piston ring. It was confirmed that the effect of reduction of friction loss between the cylinder wall and the piston skirt and between the cylinder wall and the piston ring was obtained. Further, it is understood that even when the dimples are abraded off from the sliding surfaces of the piston skirt and the piston ring, the effect of reduction of friction loss can be obtained for a relatively long period on the basis of the above-described relationships d<LS and d<LR.

Example 4

A cylinder wall and a piston skirt made of the same materials as described in Example 2 were prepared, which were used in the same internal combustion engine for automobiles as described in Example 1. The thickness of the lubricating oil film formed between the sliding surfaces of the cylinder wall and the piston skirt was 8 μm under the ordinary operating condition of the engine as described in Example 2. The sliding surfaces of the cylinder wall and the piston skirt were formed as follows. The cylinder wall having a Vickers hardness of approximately Hv 300 was subjected to honing to thereby form a base surface as indicated at 20 in FIGS. 7A–7C. The base surface was an extremely smooth surface formed with microscopic intersecting grooves. The base surface had a surface roughness having arithmetical mean roughness Ra of 0.03 μm and maximum height Ry of 0.5 μm. The base surface then was subjected to irradiation with a laser beam using a YAG laser, to form fine grooves as indicated at 21 in FIGS. 7A–7C. The grooves extended perpendicular to the sliding direction of the piston skirt without intersecting. The grooves had dimensions listed in Table 1.

The piston skirt having a Vickers hardness of approximately Hv 150 was subjected to grinding to form a base surface which had a surface roughness having maximum height Ry of 1.0 µm. The base surface was subjected to turning to form the same grooves as those of the sliding surface of the cylinder wall except for the dimensions of the grooves as listed in Table 1.

TABLE 1

| Dimensions of Grooves: Average (Range) µm | Cylinder Wall | Piston Skirt |
|---|---|---|
| Width | 20 (10 to 30) | 60 (50 to 80) |
| Depth | 4 (3 to 5) | 13 (10 to 15) |
| Pitch | 80 (50 to 100) | 150 (110 to 180) |
| Distance between grooves | 60 | 90 |

The calculation of ratio T/Tsmooth was made relative to the thus-formed sliding surfaces of the cylinder wall and the piston skirt as described in Example 1. Substantially the same characteristic curves of ratio T/Tsmooth as those of Example 1 were obtained from the calculation results. In Example 4, there existed the relationship b<L between average value b of the maximum widths of the grooves of the sliding surface of the cylinder wall and average value L of the minimum distances between the grooves of the sliding surface of the piston skirt. It was confirmed that friction loss between the cylinder wall and the piston skirt was reduced on the basis of the relationship b<L. Example 5

A cylinder wall, a piston skirt and a piston ring made of the same materials as described in Example 2 were prepared, which were used in the same internal combustion engine for automobiles as described in Example 1. The thickness of the lubricating oil film formed between the sliding surfaces of the cylinder wall and the piston ring was approximately 1 µm. The sliding surface of the cylinder wall was formed as follows. A base surface of the sliding surface was formed in the same manner as described in Example 4. The base surface had a surface roughness represented by maximum height Ry of 0.5 µm. Fine grooves were formed in the same manner as described in Example 4. The grooves had maximum depths $H_{1-N}$ ranging from 3 µm to 5 µm, widths $b_{1-N}$ ranging from 10 µm to 30 µm (average value b=4 µm) and pitches $P_{1-N}$ ranging from 60 µm to 100 µm (average value P=80 µm). Average value LGC of minimum distances between the grooves was 60 µm.

The sliding surface of the piston skirt was formed as follows. A base surface of the sliding surface was formed in the same manner as described in Example 4. The base surface had a surface roughness having the same maximum height Ry as that of the base surface of the sliding surface of the cylinder wall. Fine grooves were formed in the same manner as described in Example 4. The grooves had the same dimensions as those of the sliding surface of the piston skirt of Example 4.

The piston ring was subjected to honing to form a base surface of the sliding surface. The base surface had extremely fine and intersecting grooves and a surface roughness represented by arithmetical mean roughness Ra of 0.03 µm and maximum height Ry of 0.5 µm.

Contact length CL over which the sliding surfaces of the cylinder wall and the piston ring were in contact with each other via the lubricating oil film therebetween was 0.5 mm.

The calculation of ratio T/Tsmooth was made relative to the thus-formed sliding surfaces of the cylinder wall and the piston skirt as described in Example 1. Substantially the same characteristic curves of ratio T/Tsmooth as those of Example 1 were obtained from the calculation results. In Example 5, there existed the relationship b<L between average value b of the maximum widths of the grooves of the sliding surface of the cylinder wall and average value L of the minimum distances between the grooves of the sliding surface of the piston skirt. It was confirmed that friction loss between the cylinder wall and the piston skirt was reduced on the basis of the relationship b<L. Further, there existed the relationship b+LGC<CL between average value b, average value LGC and contact length CL as described above. It is understood that the effect of reduction of friction loss can be obtained for a relatively long period on the basis of the relationship b+LGC<CL. Furthermore, assuming that the sliding surface of the piston ring has grooves between which an infinite distance exists and that average value L of minimum distances between the grooves of the sliding surface of the piston ring is infinite, there exists the relationship b<L. In this case, it is understood that friction loss between the cylinder wall and the piston ring can be reduced on the basis of the relationship b<L.

This application is based on a prior Japanese Patent Application No. 2000-352397 filed on Nov. 20, 2000, the entire content of which is hereby incorporated by reference.

Although the invention has been described above by reference to certain embodiments and examples of the invention, the invention is not limited to the embodiments and examples described above. Modifications and variations of the embodiments and examples described above will occur to those skilled in the art in light of the above teachings. The scope of the invention is defined with reference to the following claims.

What is claimed is:

1. A sliding structure for a reciprocating internal combustion engine, comprising: sliding elements relatively slidable via lubricating oil therebetween, the sliding elements including sliding surfaces opposed to each other and lubricated with a laminar flow of the lubricating oil, the sliding surfaces defining a first clearance therebetween from which the laminar flow of the lubricating oil leaks, wherein, assuming that the sliding surfaces are completely smooth surfaces defining a second clearance therebetween from which the laminar flow of the lubricating oil leaks, a first surface integral T of an inverse number of the first clearance is smaller than a second surface integral Tsmooth of an inverse number of the second clearance under condition that flow resistances to the laminar flows of the lubricating oil which leak from the first and second clearances are equal to each other with respect to pressure gradient in a direction of leakage of the laminar flows of the lubricating oil and wherein each of the sliding surfaces comprises a base surface with microscopic irregularities having a maximum height, and a plurality of dimples separated from each other by the base surface, the dimples having an average value of maximum depths which is larger than the maximum height, an average value of maximum diameters of the dimples of one of the sliding surfaces being smaller than an average value of minimum distances between the dimples of the other of the sliding surfaces.

2. The sliding structure as claimed in claim 1, wherein each of the sliding surfaces has a minimum length larger than the maximum diameters of the dimples, the minimum length extending between two opposed ends of the sliding surface.

3. A sliding structure for a reciprocating internal combustion engine, comprising: sliding elements relatively slidable via lubricating oil therebetween, the sliding elements including sliding surfaces opposed to each other and lubricated with a laminar flow of the lubricating oil, each of the sliding surfaces including a base surface with microscopic irregularities having a maximum height t, and a plurality of dimples formed in a separate relation to each other on the base surface, wherein, if the sliding surfaces are completely smooth surfaces defining a minimum clearance therebetween an amount of the lubricating oil introduced into the minimum clearance upon relative motion of the sliding elements balances with an amount of the lubricating oil discharged therefrom by pressure generated between the sliding elements, the minimum clearance is larger than a sum of the maximum heights of the microscopic irregularities of the base surfaces and smaller than an average value of maximum depths of the dimples of at least one of the sliding surfaces, and an average value of maximum diameters of the dimples of one of the sliding surfaces is smaller than an average value of minimum distances between the dimples of the other of the sliding surfaces.

4. The sliding structure as claimed in claim 3, wherein each of the sliding surfaces has a minimum length larger than the maximum diameters of the dimples, the minimum length extending between two opposed ends of the sliding surface over which a film of the lubricating oil is formed.

5. The sliding structure as claimed in claim 3, wherein a hardness of the one of the sliding surfaces is greater than a hardness of the other of the sliding surfaces.

6. The sliding structure as claimed in claim 5, wherein the average value of the maximum diameters of the dimples of the one of the sliding surfaces is smaller than an average value of the maximum diameters of the dimples of the other of the sliding surfaces.

7. The sliding structure as claimed in claim 5, wherein the maximum height of the microscopic irregularities of the base surface of the one of the sliding surfaces is smaller than the minimum clearance, and the maximum height of the microscopic irregularities of the base surface of the other of the sliding surfaces is larger than the minimum clearance.

8. The sliding structure as claimed in claim 5, wherein the sliding element having the one of the sliding surfaces is adapted to be a crankshaft and the sliding element having the other of the sliding surfaces is adapted to be a bearing metal supporting the crankshaft.

9. The sliding structure as claimed in claim 8, wherein the sliding elements are adapted to be used in the internal combustion engine for automobiles, the maximum height of the microscopic irregularities of the base surface of the sliding surface of the crankshaft being not more than 1 $\mu$m, the average value of the maximum depths of the dimples of the sliding surface of the crankshaft being in a range of −1 to 50 $\mu$m, the average value of the maximum depths of the dimples of the sliding surface of the bearing metal being in a range of 1 to 50 $\mu$m, and an average value of the maximum diameters of the dimples of the sliding surface of the bearing metal being not more than 1 mm.

10. The sliding structure as claimed in claim 5, wherein the sliding element having the one of the sliding surfaces is adapted to be a cylinder wall and the sliding element having the other of the sliding surfaces is adapted to be a piston skirt.

11. The sliding structure as claimed in claim 10, wherein the sliding elements are adapted to be used in the internal combustion engine for automobiles, the maximum height of the microscopic irregularities of the base surface of the sliding surface of the cylinder wall being not more than 1 $\mu$m, the average value of the maximum depths of the dimples of the sliding surface of the cylinder wall being in a range of 1 to 50 $\mu$m, the average value of the maximum depths of the dimples of the sliding surface of the piston skirt being in a range of 1 to 50 $\mu$m, and an average value of the maximum diameters of the dimples of the sliding surface of the piston skirt being not more than 1 mm.

12. The sliding structure as claimed in claim 5, wherein the sliding element having the one of the sliding surfaces is adapted to be a piston ring and the sliding element having the other of the sliding surfaces is adapted to be a cylinder wall.

13. The sliding structure as claimed in claim 12, wherein the sliding elements are adapted to be used in the internal combustion engine for automobiles, the maximum height of the microscopic irregularities of the base surface of the sliding surface of the piston ring being not more than 1 $\mu$m, the average value of the maximum depths of the dimples of the sliding surface of the piston ring being in a range of 1 to 50 $\mu$m, the average value of the maximum depths of the dimples of the sliding surface of the cylinder wall being in a range of 1 to 50 $\mu$m, and an average value of the maximum diameters of the dimples of the sliding surface of the cylinder wall being not more than 1 mm.

14. The sliding structure as claimed in claim 5, wherein the sliding element having the one of the sliding surfaces is adapted to be a cylinder wall and the sliding element having the other of the sliding surfaces is adapted to be a piston ring.

15. The sliding structure as claimed in claim 14, wherein the sliding elements are adapted to be used in the internal combustion engine for automobiles, the maximum height of the microscopic irregularities of the base surface of the sliding surface of the cylinder wall being not more than 1 $\mu$m, the average value of the maximum depths of the dimples of the sliding surface of the cylinder wall being in a range of 1 to 50 $\mu$m, the average value of the maximum depths of the dimples of the sliding surface of the piston ring being in a range of 1 to 50 $\mu$m, and an average value of the maximum diameters of the dimples of the sliding surface of the piston ring being not more than 1 mm.

16. The sliding structure as claimed in claim 3, wherein the minimum clearance is adapted to be determined under an operating condition of the reciprocating internal combustion engine which is most influenced for friction loss.

17. The sliding structure as claimed in claim 16, wherein a second minimum clearance smaller than the first minimum clearance is adapted to be determined under other operating condition of the reciprocating internal combustion engine.

18. The sliding structure as claimed in claim 16, wherein the operating condition comprises ⅓ of a maximum revolution number and ¼ of a maximum load.

19. The sliding structure as claimed in claim 16, wherein the operating condition comprises a maximum operating time at ⅓ of a maximum revolution number and ¼ of a maximum load.

20. A sliding structure for a reciprocating internal combustion engine, comprising: a cylinder wall including a first sliding surface; a piston skirt reciprocally moveable relative to the cylinder wall, the piston skirt including a second sliding surface opposed to the first sliding surface; and a piston ring mounted to the piston skirt, the piston ring including a third sliding surface opposed to the first sliding surface; each of the first, second and third sliding surfaces including a base surface with microscopic irregularities having a maximum height t, and a plurality of dimples separated from each other by the base surface, wherein an average value d of maximum diameters of the dimples of the first and third sliding surfaces is not more than an axial length of the piston ring, wherein a relationship between the average value d of maximum diameters of the dimples of the first sliding surface, an average value LS of minimum distances between the dimples of the second sliding surface, and an average value LR of minimum distances between the dimples of the third sliding surface is expressed as follows: d<LS and d<LR, and wherein the maximum height t of the microscopic irregularities of the base surface is smaller than a smaller one of minimum clearances generated between the first and second sliding surfaces and between the first and third sliding surfaces, the minimum clearances being determined assuming that the first, second and third sliding surfaces are completely smooth surfaces, and that an amount of the lubricating oil introduced into the minimum clearances upon relative motion of the cylinder wall, the piston skirt and the piston ring balances with an amount of the lubricating oil discharged from the minimum clearances by pressure generated between the cylinder wall, the piston skirt and the piston ring under a maximum operating time condition of the reciprocating internal combustion engine.

21. A sliding structure for a reciprocating internal combustion engine for automobiles, comprising: a cylinder wall including a first sliding surface, the first sliding surface including a base surface with microscopic irregularities having a maximum height of not more than 1 $\mu$m, and a plurality of dimples separated from each other by the base surface, the dimples having a depth ranging from 1 $\mu$m to 50 $\mu$m and an average value of maximum diameters thereof which is not more than 50 $\mu$m; a piston skirt reciprocally moveable relative to the cylinder wall, the piston skirt including a second sliding surface opposed to the first sliding surface, the second sliding surface including a base surface with microscopic irregularities having a maximum height of not more than 5 $\mu$m, and a plurality of dimples separated from each other by the base surface, the dimples having a depth ranging from 1 $\mu$m to 50 $\mu$m, an average value of maximum diameters thereof which is not more than 1 mm, and an average value of minimum distances therebetween which is larger than the average value of maximum diameters of the dimples of the first sliding surface of the cylinder wall; and a piston ring mounted to the piston skirt, the piston ring including a third sliding surface opposed to the first sliding surface, the third sliding surface including a base surface with microscopic irregularities having a maximum height of not more than 1 $\mu$m, and a plurality of dimples separated from each other by the base surface, the dimples having a depth ranging from 1 $\mu$m to 50 $\mu$m, the average value of maximum diameters thereof which is not more than 50 $\mu$m, and an average value of minimum distances therebetween which is larger than the average value of maximum diameters of the dimples of the first sliding surface of the cylinder wall.

22. A sliding structure for a reciprocating internal combustion engine, comprising: sliding elements relatively slidable via lubricating oil therebetween, the sliding elements including sliding surfaces opposed to each other and lubricated with a laminar flow of the lubricating oil, the sliding surfaces including base surfaces with microscopic irregularities having maximum heights t, respectively, and a plurality of grooves extending at an angle of not less than 45 degrees relative to a direction of the sliding motion of the sliding elements without intersecting, the grooves having an average value of maximum depths which is larger than the maximum heights t, the grooves having maximum widths of not more than a contact length CL in the direction of the sliding motion over which the sliding surfaces are in contact with each other via a film of the lubricating oil disposed therebetween, wherein an average value b of the maximum widths of the grooves of one of the sliding surfaces is smaller than an average value of minimum distances between the grooves of the other of the sliding surfaces.

23. The sliding structure as claimed in claim 22, wherein the maximum heights t are smaller than a minimum clearance between the sliding surfaces, the minimum clearance being determined assuming that the sliding surfaces are completely smooth surfaces and that an amount of the lubricating oil introduced into the minimum clearance upon relative motion of the sliding elements balances with an amount of the lubricating oil discharged from the minimum clearance by pressure generated between the sliding elements.

24. The sliding structure as claimed in claim 23, wherein the minimum clearance is adapted to be determined under an operating condition of the reciprocating internal combustion engine which is most influenced for friction loss.

25. The sliding structure as claimed in claim 23, wherein a hardness of the one of the sliding surfaces is greater than a hardness of the other of the sliding surfaces.

26. The sliding structure as claimed in claim 25, wherein the average value b of the maximum widths of the grooves of the one of the sliding surfaces is smaller than an average value B of the maximum widths of the grooves of the other of the sliding surfaces.

27. The sliding structure as claimed in claim 26, wherein the sliding elements comprise a cylinder wall having a first sliding surface, a piston skirt having a second sliding surface and a piston ring having a third sliding surface, the first and second sliding surfaces forming a first set of the sliding surfaces, the first and third sliding surfaces forming a second set of the sliding surfaces, the average value b of the maximum widths of the grooves of the first sliding surface being smaller than the average value of the minimum distances of the grooves of the second sliding surface, wherein a relationship between the average value b of the maximum widths of the grooves of the first sliding surface, an average value LGC of minimum distances between the grooves of the first sliding surface, and the contact length CL over which the first and third sliding surfaces are in contact with each other is expressed as follows: b+LGC<CL, and wherein the maximum height of the microscopic irregularities of the base surface of each of the first, second and third sliding surfaces is not more than a smaller one of minimum clearances between the first set of the sliding surfaces and between the second set of the sliding surfaces, the minimum clearances being determined assuming that the first and second sets of the sliding surfaces are completely smooth surfaces and that an amount of the lubricating oil introduced into the minimum clearances upon relative motion of the cylinder wall, the piston skirt and the piston ring balances with an amount of the lubricating oil discharged from the minimum clearances by pressure generated between the cylinder wall, the piston skirt and the piston ring under a maximum operating time condition of the reciprocating internal combustion engine.

28. The sliding structure as claimed in claim 27, wherein the maximum height of the microscopic irregularities of the base surface of each of the piston skirt, the piston ring and the cylinder wall is not more than 1 $\mu$m, the average value b of the maximum widths of the grooves of the first sliding surface of the cylinder wall being in a range of 1 to 50 $\mu$m, the average value of maximum depths of the grooves of the first sliding surface of the cylinder wall being in a range of 1 to 10 $\mu$m, the average value LGC of the minimum distances between the grooves of the first sliding surface of the cylinder wall being not more than 100 $\mu$m, the average value of maximum depths of the grooves of the second sliding surface of the piston skirt being in a range of 5 to 50 $\mu$m, the average value L of the minimum distances between the grooves of the second sliding surface of the piston skirt being in a range of 50 μm to 1 mm, the average value B of the maximum widths of the grooves of the second sliding surface of the piston skirt being not less than 50 μm.

29. The sliding structure as claimed in claim 25, wherein the sliding element having the one of the sliding surfaces is adapted to be a cylinder wall and the sliding element having the other of the sliding surfaces is adapted to be a piston skirt.

30. The sliding structure as claimed in claim 29, wherein the sliding elements are adapted to be used in the internal combustion engine for automobiles, the maximum height of the microscopic irregularities of the base surface of each of the sliding surfaces of the cylinder wall and the piston skirt being not more than 1 μm, the average value of the maximum depths of the grooves of the sliding surface of the cylinder wall being in a range of 1 to 50 μm, the average value of the minimum distances between the grooves of the sliding surface of the cylinder wall being not more than 100 μm, the average value of the maximum depths of the grooves of the sliding surface of the piston skirt being in a range of 5 to 50 μm, and the average value of the minimum distances between the grooves of the piston skirt being not more than 1 mm.

31. A reciprocating internal combustion engine, comprising: a sliding structure including sliding elements relatively slidable via lubricating oil therebetween, the sliding elements including sliding surfaces opposed to each other and lubricated with a laminar flow of the lubricating oil, the sliding surfaces defining a first clearance therebetween from which the laminar flow of the lubricating oil leaks, wherein, assuming that the sliding surfaces are completely smooth surfaces defining a second clearance therebetween from which the laminar flow of the lubricating oil leaks, a first surface integral T of an inverse number of the first clearance is smaller than a second surface integral Tsmooth of an inverse number of the second clearance under condition that flow resistances to the laminar flows of the lubricating oil which leak from the first and second clearances are equal to each other with respect to pressure gradient in a direction of leakage of the laminar flows of the lubricating oil and wherein each of the sliding surfaces comprises a base surface with microscopic irregularities having a maximum height, and a plurality of dimples separated from each other by the base surface, the dimples having an average value of maximum depths which is larger than the maximum height, an average value of maximum diameters of the dimples of one of the sliding surfaces being smaller than an average value of minimum distances between the dimples of the other of the sliding surfaces.

* * * * *